US009916730B2

(12) United States Patent
Berman

(10) Patent No.: US 9,916,730 B2
(45) **Date of Patent: *Mar. 13, 2018**

(54) GAMING DEVICE HAVING CARD GAME

(71) Applicant: KING SHOW GAMES, INC., Minnetonka, MN (US)

(72) Inventor: Bradley Berman, Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,843

(22) Filed: Apr. 24, 2017

(65) Prior Publication Data

US 2017/0228985 A1 Aug. 10, 2017

Related U.S. Application Data

(63) Continuation of application No. 14/302,760, filed on Jun. 12, 2014, now Pat. No. 9,633,522.

(60) Provisional application No. 61/835,330, filed on Jun. 14, 2013.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ...... *G07F 17/3267* (2013.01); *G07F 17/3246* (2013.01); *G07F 17/3288* (2013.01); *G07F 17/3293* (2013.01)

(58) Field of Classification Search
USPC ......... 463/9, 11, 15, 17, 20, 22, 25; 273/292
See application file for complete search history.

(56) References Cited

U.S. PATENT DOCUMENTS

| | | | |
|---|---|---|---|
| 9,240,094 | B2 | 1/2016 | Acres |
| 2005/0054409 | A1 | 3/2005 | Cannon |
| 2007/0052175 | A1 | 3/2007 | McGurk et al. |
| 2007/0132183 | A1 | 6/2007 | Moses |
| 2007/0135193 | A1 | 6/2007 | Nicely |

*Primary Examiner* — Adetokunbo O Torimiro

(57) ABSTRACT

Embodiments of the present invention are directed to an apparatus, system, computer readable storage media, and/or method that involve or otherwise facilitate a card game or secondary card game played on a gaming device. The card game may be structured to use similar rules to a blackjack-styled card game. The card game may be played against an opponent, such as a computer, dealer, or another player. Alternatively, the card game may include the display of one or more cards and a process to determine if a total value of the cards meets a predefined criterion. A win against an opponent or satisfaction of the predefined criterion may progress the card game to another round of play. These rounds of play may continue until an opponent wins, or until the predefined criterion is not satisfied.

20 Claims, 19 Drawing Sheets

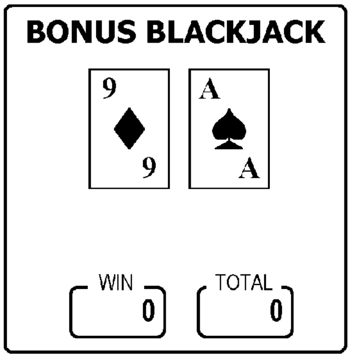

Hand of Blackjack is dealt to player

FIG. 5A

A total of 17, 18, 19, 20, or 21 is an automatic winner. Each score awards a credit value based on Total Bet

FIG. 5B

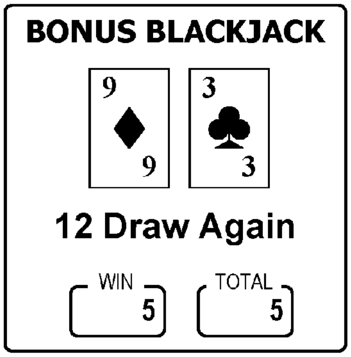

If the player has less than 17, they must draw a card to their hand by touching the screen or pressing a button

FIG. 5C

The player continues to draw cards until they win (with a total between 17 and 21) or bust (with a total over 21)

FIG. 5D

If the player has a 9, 10, or 11, an option could appear for the player to only draw one card but win double for a winning hand

FIG. 5E

If the single card option is chosen and paying score is not reached, the game is over

FIG. 5F

Alternatively, instead of ending the game, the player could continue to draw until pay/bust, but with diminished pays

FIG. 5G

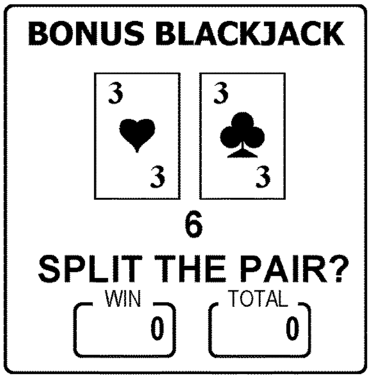

If the player is dealt a pair, they could split the hand and play two hands (FIG. 5I)

FIG. 5H

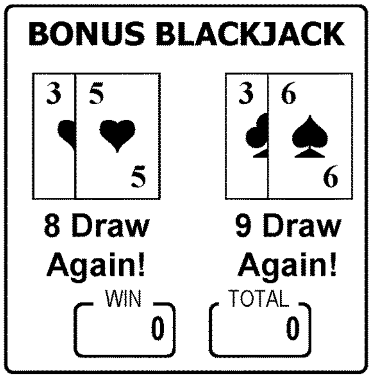

Resulting multiple hands are played until either, both, or just one of the hands pays/busts

FIG. 5I

The number of hands could reset to one after pay/bust, or the next deal could include multiple hands

FIG. 5J

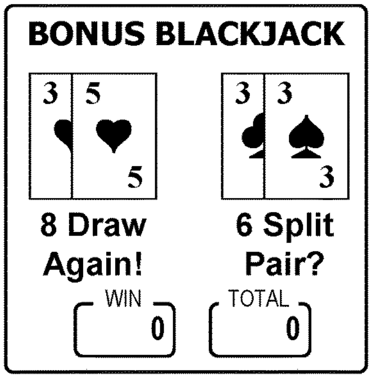

Additional pairs may allow for additional split hands

FIG. 5K

A score of 17 through 21 in a single hand wins credits and progresses the Bonus to the next round. A score of over 21 ends the Bonus.

FIG. 5L

Hands of Blackjack are dealt to the player and to a computer dealer. The dealers's cards can be face-up, face-down, or 1-up &1-down

FIG. 8A

The player can draw a card (hit) or stand with the current card total. If the current total is 21, the player automatically stands

FIG. 8B

After player stands, the dealer hits or stands based on card values in dealer's hand. Dealer hits with 16 or less and stands with 17 or more.

FIG. 8C

If the player wins, credits are awarded and the bonus progresses to the next round. If the dealer wins, the bonus ends (credits may be awarded)

FIG. 8D

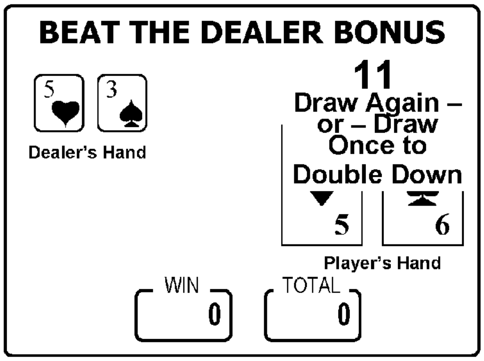

If the player has 9, 10, or 11, an option could appear for the player to draw only one card but be paid double on a win

FIG. 8E

If the single card option is chosen and the player's score does not beat the dealer, the bonus or game is over

FIG. 8F

Special Rules could be imposed on the dealer either randomly or after certain conditions are met

FIG. 8G

If the player is dealt a pair, the player may be able to split the hand and play 2 hands

FIG. 8H

The Player can draw cards or stand for each hand. Progression to next round may require one hand to win or both hands to win.

FIG. 8I

The number of hands could reset to one, or the next deal could include multiple hands

FIG. 8J

Additional pairs may allow for additional split hands.

FIG. 8K

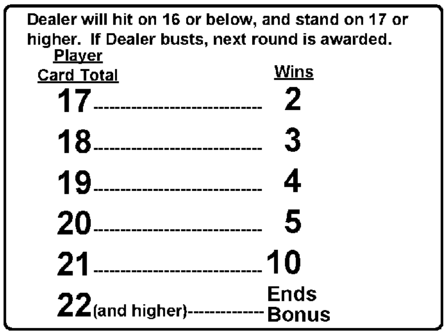

A score of 17 though 21 in a single hand wins credits. Beating the Dealer's hand progresses the bonus to the next round.

FIG. 8L

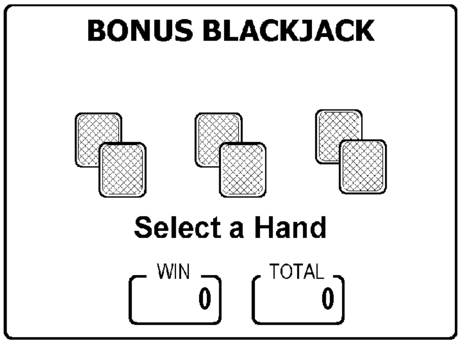

The player picks from multiple decks or hands to begin.

FIG. 9A

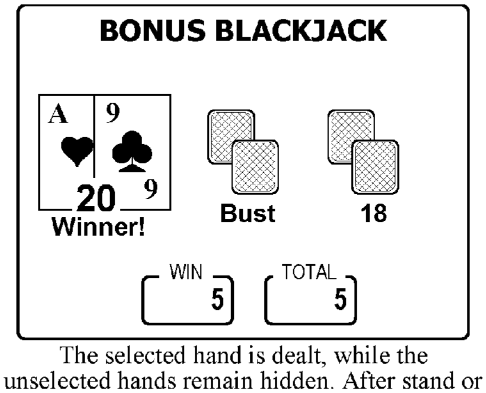

The selected hand is dealt, while the unselected hands remain hidden. After stand or bust, the final results of all hands are shown.

FIG. 9B

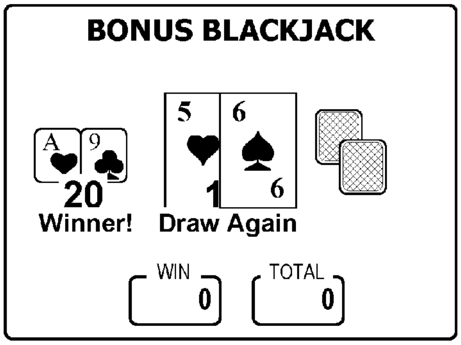

Alternatively, the player could play more/all of the hands. Hands could be played concurrently or consecutively.

FIG. 9C

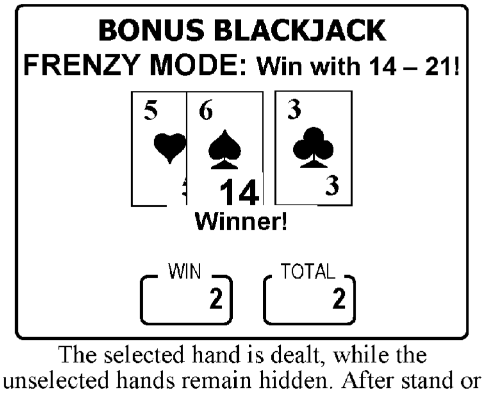

The selected hand is dealt, while the unselected hands remain hidden. After stand or bust, the final results of all hands are shown.

FIG. 9D

Win multipliers could be added either randomly or when certain criteria are met.

FIG. 9E

Additional pays could be awarded for using many cards, for suited cards, multiples of the same card rank, etc.

FIG. 9F

Special awards, such as Progressives, could be awarded for multiple consecutive blackjacks, multiple identical hands, winning streaks, winning number of split hands, etc.

The player could select from a number of face-down cards until a pay/bust is reached (or until they stand if playing a Dealer).

Dice could be used instead of (or in addition to) cards.

GAMING DEVICE HAVING CARD GAME

RELATED APPLICATIONS

This application is a continuation of U.S. application Ser. No. 14/302,760, filed Jun. 12, 2014, now U.S. Pat. No. 9,633,522, which claims the benefit of Provisional Patent Application No. 61/835,330, filed on Jun. 14, 2013, to which priority is claimed pursuant to 35 U.S.C. § 119(e) and which is incorporated herein by reference in its entirety.

FIELD OF THE INVENTION

This disclosure relates generally to games, and more particularly to systems, apparatuses and methods for operating a gaming device having a secondary card game.

BACKGROUND

Casino games such as poker, slots, and craps have long been enjoyed as a means of entertainment. Almost any game of chance that can be played using traditional apparatus (e.g., cards, dice) can be simulated on a computer. The popularity of casino gambling with wagering continues to increase, as does recreational gambling such as non-wagering computer game gambling. It is also likely that most new games will be implemented, at least in part, using computerized apparatus.

One reason that casino games are widely implemented on computerized apparatus is that computerized games are highly adaptable, easily configurable and re-configurable, and require minimal supervision to operate. For example, the graphics and sounds included in such games can be easily modified to reflect popular subjects, such as movies and television shows.

Computer gaming devices can also be easily adapted to provide entirely new games of chance that might be difficult to implement using mechanical or discrete electronic circuits. Because of the ubiquity of computerized gaming machines, players have come to expect the availability of an ever wider selection of new games when visiting casinos and other gaming venues. Playing new games adds to the excitement of "gaming". As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill. In some jurisdictions, the absence of skill when determining awards during game play is a requirement.

The present disclosure describes methods, systems, and apparatus that provide for new and interesting gaming experiences, and that provide other advantages over the prior art.

SUMMARY

To overcome limitations in the prior art described above, and to overcome other limitations that will become apparent upon reading and understanding the present specification, embodiments of the present invention are directed to an apparatus, system, computer readable storage media, and/or method that involve or otherwise facilitate a card game or secondary card game played on a gaming device.

The card game may be structured to use similar rules to a blackjack-styled card game. The card game may be played against an opponent, such as a computer, dealer, or another player. Alternatively, the card game may include the display of one or more cards and a process to determine if a total value of the cards meets a predefined criterion. A win against an opponent or satisfaction of the predefined criterion may progress the card game to another round of play. These rounds of play may continue until an opponent wins, or until the predefined criterion is not satisfied. Awards may be provided for the card values achieved in the rounds of play, for the number of rounds completed, and/or based on other pay criteria. In addition, special awards may be provided when certain predefined conditions are met.

The card game may be a secondary or bonus game layered on a primary or base game played on the gaming device, or may be the primary or base game of the gaming device. In some secondary game embodiments, the card game may be used to modify an award provided in a base game, such as, for example, providing a multiplier that multiplies any awards won in the base or primary game.

In one embodiment, a gaming device includes a gaming display, a player interface, and a processor configured to display multiple cards to a player, determine the total value of the cards associated with markings on the cards, determine if the total value of the cards meets a predefined criterion, and award a pay based on the total value of the cards and whether the cards meet the predefined criterion.

In some embodiments, determining the total value of the cards associated with the markings on the cards follows rules associated with the game Blackjack or Twenty-one. For example, all face cards may have a value of "10" and Aces may have a value of either "1" or "11." The predefined criterion may be related to a fixed table of pays related to the possible total card values, or may relate to a total value of a separately dealt hand ("dealer hand" or "device hand"). In some embodiments, the player may be able to hit or request additional cards. This hit or request may be available only if the player is below a certain total card value, or may be available anytime the card value is below a value of "21."

BRIEF DESCRIPTION OF THE DRAWINGS

FIGS. 5A-5L are diagrams of various examples of a card game according to embodiments of the invention.

FIGS. 8A-8L are diagrams of various examples of another card game according to embodiments of the invention.

FIGS. 9A-9I are diagrams of possible variations of a card game played on a gaming device according to embodiments of the invention.

DETAILED DESCRIPTION

Figure 1:
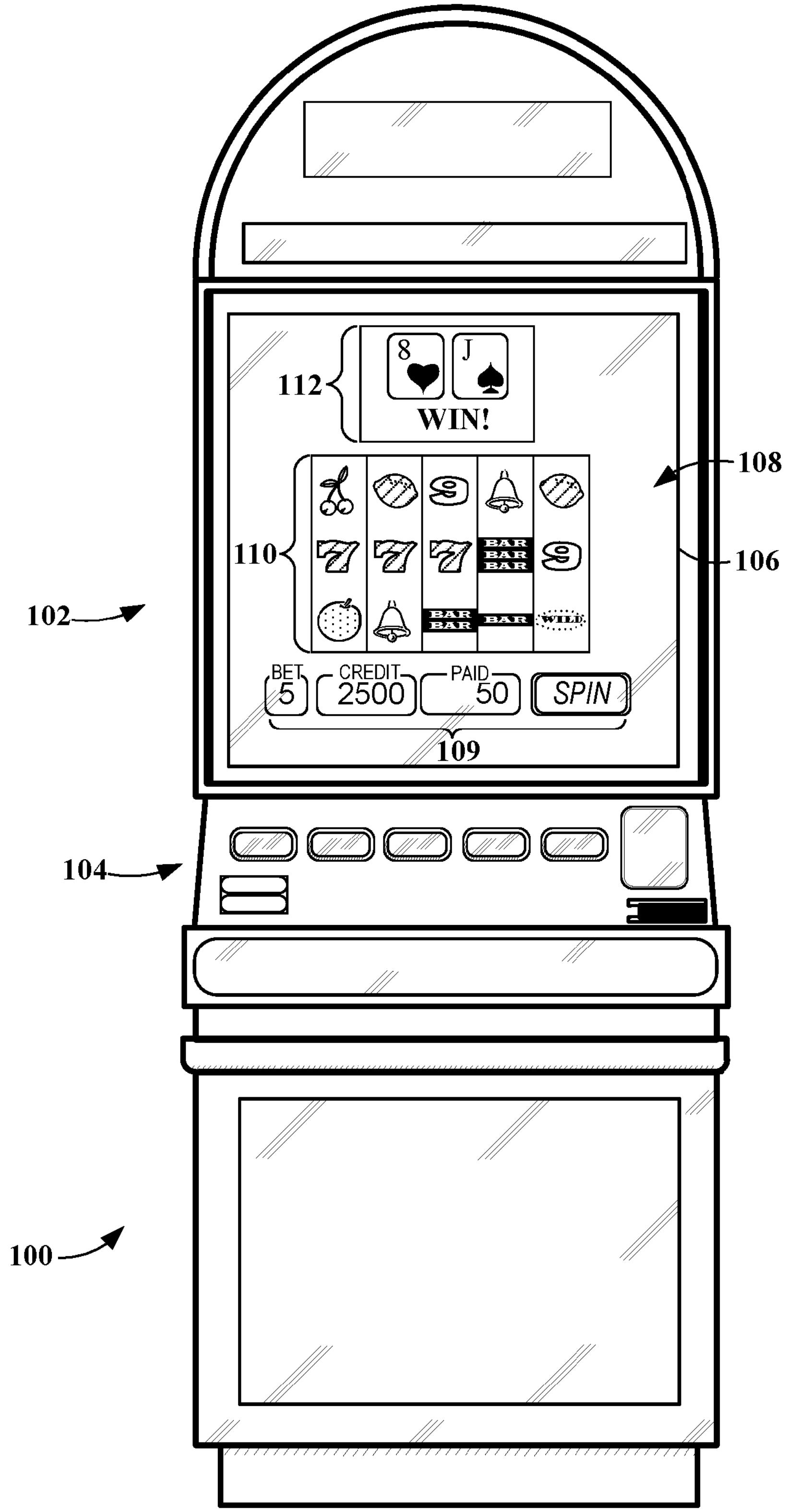
FIG. 1 is a diagram of a gaming machine according to embodiments of the invention.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the term "reels," "cards," "decks," and similar mechanically descriptive language may be used to describe various apparatus presentation features, as well as various actions occurring to those objects (e.g., "spin," "draw," "hold," "bet"). Although the present disclosure may be applicable to both to manual, mechanical, and computerized embodiments, and any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms "cards," "decks," "reels," "hands," etc., are intended to describe both physical objects and emulation or simulations of those objects and their behaviors using electronic apparatus.

In various embodiments of the invention, the gaming displays are described in conjunction with the use of data in the form of "symbols." In the context of this disclosure, a "symbol" may generally refer at least to a collection of one or more arbitrary indicia or signs that have some conventional significance. In particular, the symbol represents values that can at least be used to determine whether to award a payout. A symbol may include numbers, letters, shapes, pictures, textures, colors, sounds, etc., and any combination therebetween. A win can be determined by comparing the symbol with another symbol. Generally, such comparisons can be performed via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

Generally, systems, apparatuses and methods are described for enhancing winning result opportunities in gaming activities. The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in stand-alone games, multi-player games, etc. Further, the disclosure may be applied to games of chance, and descriptions provided in the context of any representative game (e.g. card games) is provided for purposes of facilitating an understanding of the features described herein. However, the principles described herein are equally applicable to any game of chance where an outcome(s) is determined for use in the player's gaming activity. The game features described herein may be employed in stand-alone games, primary/base games, bonus games, side bet games, etc.

Embodiments of the present concept include providing gaming devices (also referred to as gaming apparatuses or gaming machines), gaming systems, and methods of operating these devices or systems to provide game play that utilizes operations of a card game. In one embodiment, a method of operating a gaming device includes providing a secondary card game that is accessed through a result or outcome of a primary/base game. The secondary card game is played to win credits or other awards in addition to any awards won in the base game. In other embodiments, a secondary card game may be initiated by a mystery trigger or other condition not related to the outcome of a base game. In still other embodiments, the card game itself may be the primary or base game. In some embodiments, the card game includes a persistence feature where multiple rounds of the card game continue until a bonus ending event occurs. In other embodiments, the card game may be played only once. The card game may also be used in some embodiments to modify any award provided in a base game, such as, for example, providing a multiplier that multiplies any awards won in the base or primary game.

Numerous variations are possible using these and other embodiments of the inventive concept. Some of these embodiments and variations are discussed below with reference to the drawings. However, many other embodiments and variations exist that are covered by the principles and scope of this concept. For example, although some of the embodiments discussed below involve reel-based slot machine examples of this concept, other embodiments include application of secondary card games in other types of poker games, slot games, or other games of chance. Some of these other types of embodiments will be discussed below as variations to the examples illustrated. However, many other types of games can implement similar techniques and fall within the scope of this inventive concept.

In one embodiment, a card game deals a hand of blackjack to a player. The player plays for specific hand values and gets to continue to play rounds of the game if they continue to meet a range of specified hand values. As discussed above, card valuation in blackjack or twenty-one includes giving each numerical card its face value (e.g., a seven of hearts is valued at "7"), all face cards are valued at "10," and aces can be valued at either "1" or "11." In this embodiment, if the player has 17, 18, 19, 20, or 21 in card values from the initial deal, he or she is an automatic winner. Here, for example, a paytable for the card game may indicate that 17 pays 2, 18, pays 3, 19 pays 4, 20 pays 5, and 21 pays 10, where all pays are times a total bet. If the player has less than 17, the player can swipe the screen, touch a button, or otherwise activate an interactive feature of the game device to hit or draw a card to their hand. The player keeps drawing until he or she gets a pay or busts, which is getting a total card value of over 21. If the player obtains a hand value between 17 and 21 points, the player receives the award value associated with their hand value, and gets to play a next round of the game. If the player busts, the bonus is then over, although the player may receive an award value for the bust before the card game ends.

In some embodiments, if the player has a total card value of 9, 10, or 11 an option is available to double down. Here, the player can win double what the normal pay is, but they only get 1 card, and if they have less than a pay, the bonus is over. There are various other methods that a double down is configured in other embodiments, including 1) allowing the player to double down and hit where he or she receives double if the resulting total card value of the three cards is 17 or more, but receives only half of what is indicated in the paytable if the third card results in a total card value of less than 17, and an additional draw is needed to bring the total card value over 16. In other embodiments, the double down may just pay the normal pay schedule when a 17 or more is not reached with the third card. In some embodiments, playing a double down may require a side bet or a portion of the bonus award already received to be risked or wagered to participate in the double down.

In other embodiments, a player may "split" pairs of cards dealt to them in the card game. For example, if the player is dealt a pair of twos (or threes, fours, etc.) the player has the option to split the pair and play 2 hands. Each hand after the split is played for awards. Additional pairs received, may also be split, although there may be a cap in some embodiments. In some embodiments, a win in either hand allows the card game to continue to another round, while in other embodiments, a win (17 or above in total card points) is needed to continue. In other embodiments, each hand that wins continues to the next round. Hence, for example, if a (8,8) is split and the player makes 17 in the first hand and 18 in the second hand, the player would win both hands and receive two starting hands of two cards in the next round. As long as the multiple hands continue to win, the player keeps playing both hands. Each of the hands would end independently, so a loss in one hand would still allow winning hands to continue to the next round.

This multiple-hand principle may also be used in community versions of the card game. For example, if three gaming devices were connected and a bonus initiation on one of the gaming devices allowed any of the three devices currently being played to go to a secondary community card game bonus, all three of the hands on the three devices would have to lose for the card game bonus to end. In some embodiments, even if one of the players did not receive a winning hand they may still be eligible for community prizes, or may be given another hand in the next round (i.e., all three hands would have to be losers for the bonus to end), or they may have to wait for one or two (or more) rounds to receive another hand (thereby hoping that the other player or players continue to win so they have another opportunity to win credits in a later round).

In other embodiments, the card game may resemble a more traditional blackjack or twenty-one game. For instance, in some of these embodiments, the card game may deal a hand of blackjack to the player and a hand for the machine ("dealer"). The player may then play normal blackjack rules (or a known variation of blackjack rules) against the "dealer". If the player wins a hand or round, the player is awarded a prize amount and gets to play another round. The pay table for wins could be based on the result against the dealer, the card values of the final hand, the card values of the final hand plus the dealer's final hand, or a combination of the above. The dealer's hand could be open face (shows both cards), could be 1 up and 1 down, or could show both cards down.

Many different variations and embodiments exist that utilize elements of the card games discussed above. For example, in some embodiments, a player may be able to pick from multiple decks or stacks of cards on the screen to deal 2 card hands (starting hands) and draws (hits). Additionally, the player may get to physically interact with the game screen to hit, stay, or otherwise manipulate card game features. For example, the player may be able to tap or swipe the display screen to deal, hit, or indicate that they want to stay on hand.

In other embodiments, a card game may deal out multiple 2 card hands face down where the player is allowed to pick one of the hands to play (e.g., 1 of 2, 1 of 3, 1 of 4, 2 of 4, 1 of x, or y of x). The hands that were not chosen may have their starting value revealed at the end.

In other embodiments, a player may have to lose multiple hands before having the card game end. In some embodiments, the card game may not end if the player loses the first, or first through $n^{th}$ hands. Thus, for example, in an embodiment where the game cannot end on the first five hands, the player will get to play at least six hands, even though they may not receive awards for non-winning hands in the first five hands In still other embodiments, a player may earn "safe hand" awards by receiving a blackjack on the deal, where the "safe hand" award could be used to continue when a subsequent hand busts.

In addition, although particular hand value conditions were used above to illustrate how a card game could provide awards and progress through multiple rounds, other embodiments may use different techniques, numbers, or criteria for continuing a bonus. For example, the minimum hand value may be 16 rather than 17. In another example, a player may only get to draw or hit one additional card to meet the minimum value. Thus, the player could "lose" by either busting or failing to meet the minimum requirement with up to three cards.

In other embodiments, the game may have a "frenzy" mode, where the various awards or next-round criteria are changed to be much lower or higher. In some embodiments, mystery multipliers may be included either in the card deck, or elsewhere in the card game that give a multiplier to multiply a current win or the total win. Additionally, wild cards or "split" cards may be included in the card deck.

In some embodiments, there may be state based multipliers for the next hand in the bonus. For example, if a player wins with a 21, his or her next hand would have a 5× multiplier. Similarly, if the player wins with a 20, his or her next hand would have a 3× multiplier, a 19 would give the next hand a 2× multiplier. Additionally, the multiplier used on a particular hand may be increased by the receipt of another winning hand. Thus, if a player wins with a 21 and receives a 5× multiplier on a subsequent hand, and the player receives another 21, the multiplier may be summed or multiplied together to get a 10× or 25× multiplier for the hand following the subsequent hand. There may or may not be a cap on the size of the multiplier.

The game could use a single 52-card deck, it could use a modified deck of cards with more or less than 52 cards, or it could use multiple conventional or modified decks. The decks may be re-used within rounds of a game, or a fresh deck could be used for every hand or round.

There could be numerous opportunities for bonus or special pays within the game. For example, there could be a bonus pay for suited cards dealt or accumulated in a final hand. Additionally, there could be special pays for hands that use lots of cards: 7-card hand, 6-card hand, 5-card hand, or x-card hand (that are less than or equal to 21). The game could also include progressives for hitting multiple blackjacks in a row, or having the same hand multiple times in a row, for winning streaks, for splitting up to 4 times and winning all 4 hands, etc. The progressive could be a multi-level progressive, such as a 3-level progressive, where two blackjacks in a row wins the first level, three blackjacks wins the second level, and four or more blackjacks wins the third level.

In some embodiments, multiple hands can be played at same time. For example, in a three-hand embodiment where a player can play all three hands, different game ending criteria may be used, such as the player having to lose either two or three of the hands for the card game to end. In other embodiments, different numbers of hands or advancement criteria (criteria used to determine if a player progresses to another round to play again) may be used.

Additionally, in some embodiments, a game could deal out 6 cards (or another number of cards) face down, and allow the player to touch or otherwise flip over two of the cards that they want to use as their initial dealt hand. The other cards, or a different set of cards to pick from, may be used during hits or draws for additional cards. In another example, 6 cards are dealt face down, and a player slides selected cards up to a player area to reveal and ultimately play with them. The player may continue to slide up cards until they get a pay or bust.

In still other embodiments, cards for play may be displayed on sides of cubes or dice (which can be of any shape), where the player rolls the dice to determine an initial hand. Another die may be used for each hit or draw, or one or both of the original dice may be used to obtain a draw or hit card. In other embodiments, the first two dealt cards may come from a deck and any subsequent hit or draw card may be received via a die with cards shown on each face of the die. Additionally, more dice may be rolled than used. Here, for example, a player may roll 3, 4, 5, 6, etc. dice and then either select the cards they want to use or have the dice be coded, shaded, colored, etc. to be given a specific order of use (e.g., the two red dice are used as the dealt hand, and then the blue die, then the green die, and finally, the purple die if needed. If some of the dice are not used, they may be carried forward to the next game (if the present game is a win) where they can be used, or must be used.

Other embodiments may relate to a reverse blackjack game. Here, a "stop-drawing-cards criterion" and "end-without-a-win criterion" may the reverse of some of the embodiments above. For example, a game may be played in which the player starts with a score of 21 and rank values are subtracted rather than added. The player may be able to repeatedly hit until the score is 4 or less where a winning criterion may be a score in the range of 0-4, and anything negative is an automatic loss.

In some embodiments, user interface functionality may be incorporated into a card game, where the player is involved in "cutting" a deck prior to cards being dealt. For example, a display may include a deck/shoe of cards as well as controls to let the player choose a spot to "cut" the cards. This could be represented by giving the player a yellow card and letting the player insert the yellow card in an arbitrary location. The gaming device would then cut the cards at that location. Additionally, some of these embodiments may allow the re-use of the yellow card to pick a "reshuffle" location in the deck/shoe after the cards are cut. Play would proceed until the reshuffle location is reached, at which point the cards would be reshuffled and the player would have another chance to cut the cards.

Additional embodiments and variations of this concept may include one or more of the following:

1) Awarding a pay with each card that's dealt/drawn. The pay could be conditional. The occurrence and/or amount of the pay may depend on one or more of: card rank; card suit; state of the current round; state of the bonus overall. For example, a pay could be awarded each time a face card is drawn/dealt, or a pay could be awarded if, on the first game of the bonus, you bust with a bust card of 6.

2) If there's a win and another round is awarded, then some of the cards are kept from the current round for use in the next round. In some variations, any and all. Aces in the current game may be kept, for use in the next game. Alternatively, all but the last two cards dealt/drawn from the current game may be discarded. Here, if those two cards score in the 17-21 range, then a win is awarded and another round is started by dealing two fresh cards (like normal). If the two kept cards sum to less than 17, then a third card is drawn and play proceeds as usual. The following example outlines some of the possible features of this embodiment: In round 1, the 3 and K (in that order) are dealt. After the player hits, an 8 is drawn, for a total of 21. An award of 10× is provided and the K and 8 are kept for the second round of play. Since the K and 8 already give the player an 18, an award of 3× is automatically provided to the player and two new cards are dealt for the third round. In the third round, a Q and 3 (in that order) are dealt. After the player hits, a 4 is drawn for a total of 17. An award of 1× is provided and the 3 and 4 are kept for the fourth round. Round four is thus started with the 3 and 4 (in that order). A draw is made which results in a Jack, which gives a total of 17 and an award of 1×. The 4 and J are kept for the fifth round. In round five, the player starts with the 4 and J (in that order) for a 14 and draws a 10. This pushes the card values over the limit and the gave event ends.

3) Each round is just a two-card draw. Here, the win criterion may use a range of values that's broader than just 17-21. Here, two alternatives may be used as the criterion to award another round. First, while a pay may be awarded only if the sum of the rank values is greater than 16, the progression to another round may be conditioned on the rank some being higher than 10 or some other value that is different than the criterion for an award. In the other alternative, another round may be awarded if the particular card sum has not been reached before. For example, in round 1, the cards are 8 and 4, for a score of 12. In round 2, the cards are 5 and 4, for a score of 9. In round 3, the cards are K and 2, for a score of 12. Since we've already had a 12, the bonus ends.

4) Each time an Ace is drawn/dealt, a second hand is awarded to the player. Initially, the second hand is just an identical copy of the original hand. However, in one hand, the Ace is assigned a value of 11 points while in the other hand the Ace is worth 1 point. If either hand is at or below the minimum threshold, then hit (i.e. draw a card). The hit could be applied to both hands simultaneously (i.e., the drawn card is added to one hand, and a duplicate of the drawn card is added to the other hand), or hits could be carried out independently for the two hands. Drawing another Ace could make the process repeat, so more than two hands could be possible. At the end of the round, the hands could be scored separately and the sum of their pays awarded, or the pay for the round could be determined by the max hand score. The game could award another round if at least one hand is not a bust, or if at least X number of hands are not busts.

A representative embodiment for the card game played on a gaming device is shown in FIG. 1. Referring to the example gaming apparatus 100 shown in FIG. 1, the gaming apparatus includes a display portion 102 (also referred to as a gaming display), and a player interface portion 104, although some or all of the user interface 104 may be provided via the display 102 in touch screen embodiments. The display portion 102 may include one or more displays 106 that may be included in physically separate displays or as portions of a common large display. Here, the game display 106 includes a game play portion 108 that displays game elements and symbols 110, a secondary game play portion 112 that displays a secondary card game, and an operations portion 109 that can include meters, various game buttons, or other game information for a player of the gaming device 100.

The user interface 104 allows the user to control and engage in play of the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, or any other user input system or mechanism that allows the user to play the particular gaming activity.

The user interface 104 may allow the user or player to enter coins, bills, or otherwise obtain credits through vouchers, tokens, credit cards, tickets, etc. Various mechanisms for entering such vouchers, tokens, credit cards, coins, tickets, etc. are known in the art. For example, coin/symbol input mechanisms, card readers, credit card readers, smart card readers, punch card readers, radio frequency identifier (RFID) readers, and other mechanisms may be used to enter wagers. It is through the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The display portion 102 may include one or more of an electronic display, a mechanical display, and a fixed display information, such as paytable information associated with a glass/plastic panel on the gaming machine 100. The symbols or other indicia associated with the play of the game may be presented on an electronic display device or on mechanical devices associated with a mechanical display. Generally, the display portion 102 devotes the largest portion of viewable area to the primary gaming portion 108. The gaming portion 108 is generally where the visual feedback for any selected game is provided to the user. The gaming portion 108 may render graphical objects such as cards, slot reels, dice, animated characters, and any other gaming visual known in the art. The gaming portion 108 also typically informs players of the outcome of any particular event, including whether the event resulted in a win or loss.

In some the example embodiments illustrated herein, the gaming portion 108 may display a grid 110 (or equivalent arrangement) of game symbols. The grid 110 includes rows and columns (or equivalent arrangements) of symbols that can be evaluated for awards based on predefined combinations or other metrics during a game play event. In this illustrated example, the gaming portion 108 is dedicated to a video slot game, so each column of the grid 110 may represent a portion of a slot reel. The secondary game display 112 of FIG. 1 shows a secondary card game, such as one of the embodiments discussed above. Additional embodiments of the card game, either used in a secondary or bonus game, or as a primary or base game, are discussed below with reference to FIGS. 2A-13.

Figure 2A:
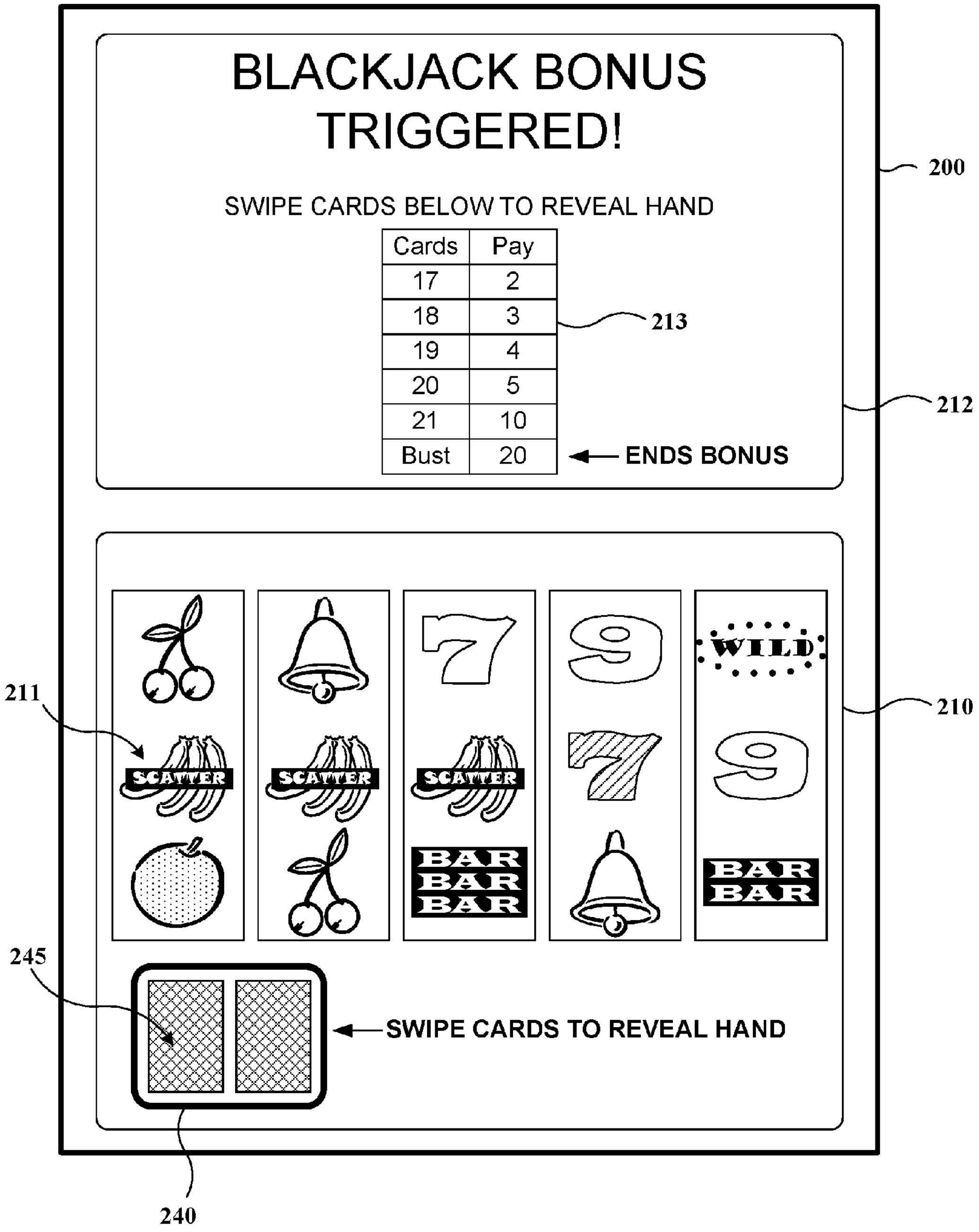
FIGS. 2A and 2B are diagrams of gaming displays showing a secondary card game according to embodiments of the invention.
Figure 2B:
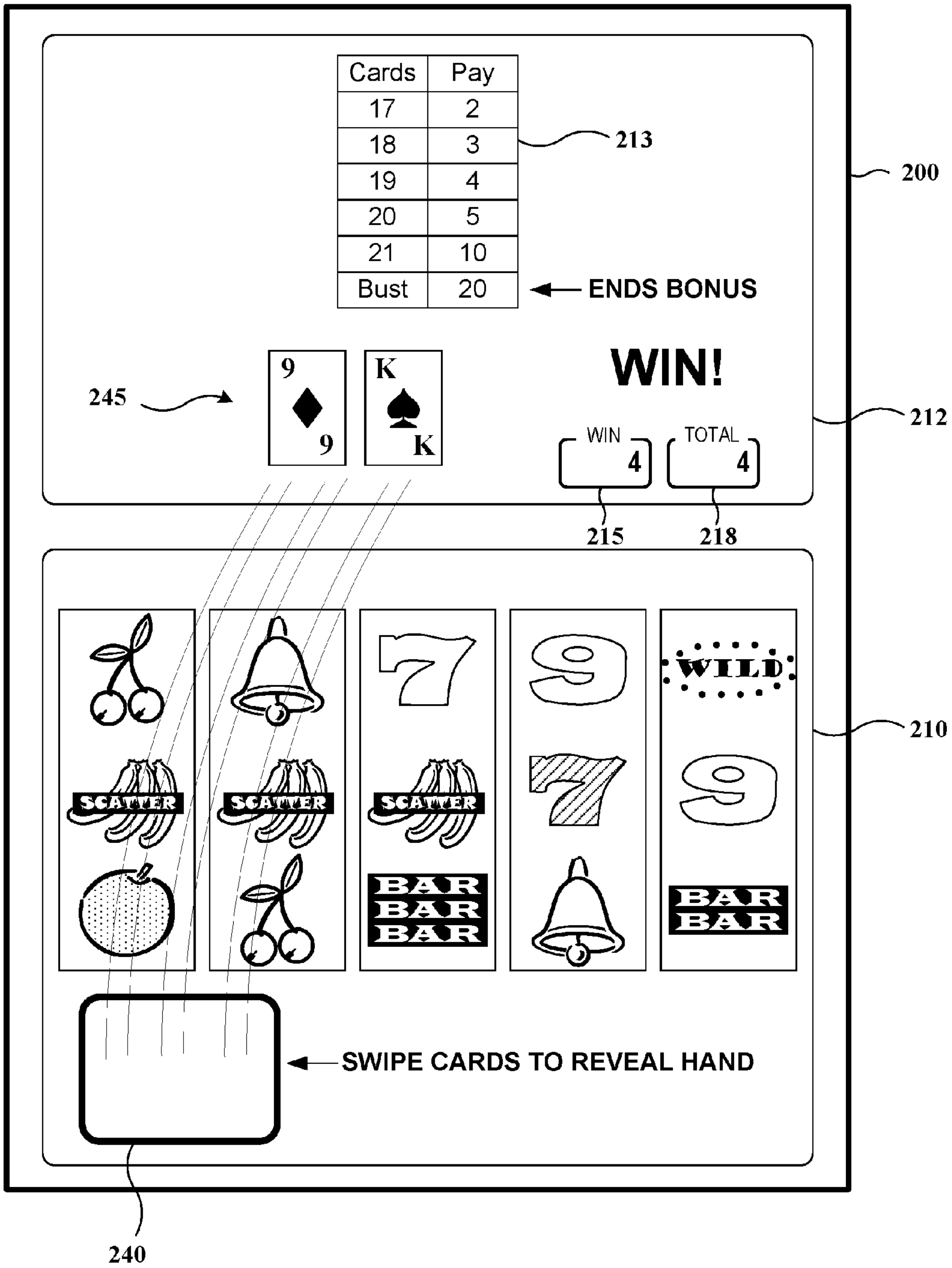

FIGS. 2A and 2B show a gaming device 200 having a primary game display 210 and a secondary game display 212 that are used to implement a secondary card game according to embodiments of the invention. Referring to FIGS. 2A and 2B, a bonus triggering event is received in the base game (here three scatter symbols 211 received on the first three/leftmost reels) shown on the primary game display 210. As indicated, the bonus has been activated or triggered, and the player is instructed to swipe cards 245 to reveal a dealt hand. In this embodiment, the cards 245 are placed face-down in a start position 240 on the primary game display 210. A bonus paytable 213 is initially shown in the secondary game display 212. As shown in FIG. 2B, when the cards 245 have been swiped (or if a predetermined amount of time has elapsed), the cards flip up to the secondary game display 212 and are shown face-up. In this embodiment, the bonus is played only against the paytable 213 (as opposed to a dealer set of cards). Here, the player has received a dealt hand 245 with a total card value of 19. Since 19 meets the award requirements shown the paytable 213, the player does not need to hit or draw and wins 4 credits, which is shown on the win meter 215 and total bonus meter 218. In some embodiments, the bonus game continues to another round with another set of cards 245 displayed face-down in the start position 240 on the primary game display 210. Multiple rounds of the bonus may continue as long as a player continues to meet a next-round criterion. For example, as long as the player receives a final card value total greater than or equal to 17 and does not bust, the player keeps continuing to new rounds. Each new bonus round may show an associated award in the win meter 215, while the accumulated total for the bonus may be shown in the total bonus meter 218.

Figure 3A:
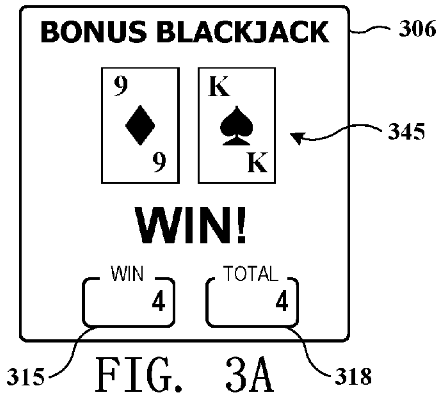
FIGS. 3A-3H are diagrams of a gaming display showing a progression of a card game according to embodiments of the invention.
Figure 3B:
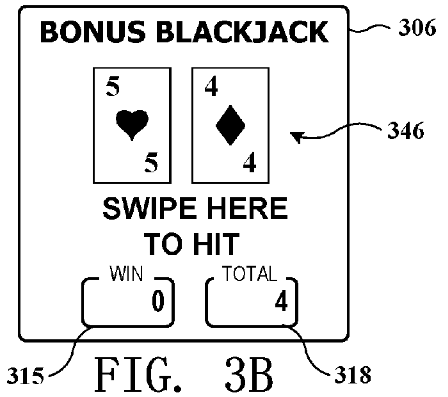
Figure 3C:
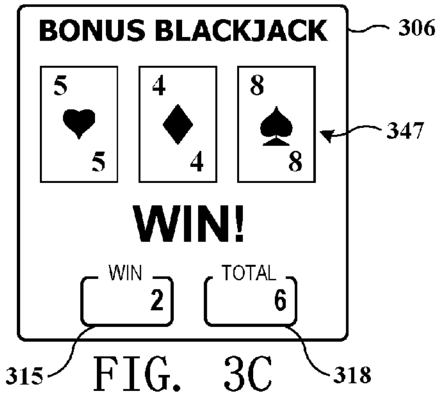

FIGS. 3A-3H show a game display 306 illustrating an example progression of a card game according to embodiments. Referring to FIGS. 3A-3H, a game display 306 shows cards 345 used in the card game, as well as a win meter 315 and total award meter 318. In FIG. 3A an outcome for a first round of the card game is shown, where the player has received a 19 on the deal. The 19 is enough for a 4 credit award and progression to a second round of the bonus game. The second round begins with the deal of cards 346 shown in FIG. 3B. Since the total value of the cards dealt 346 is only 9, the player must draw another card (or hit) to qualify for awards and progress to the next round. This draw or hit may be done automatically, may have the player make a "swiping" or other motion to indicate they will draw a card, or may allow the player to choose one card from a presentation of multiple possible cards. In this instance, as shown in FIG. 3C, the drawn card brings the total value of the hand 347 up to a 17, which is associated with a 2 credit award and progression to a third round of the game.

Figure 3D:
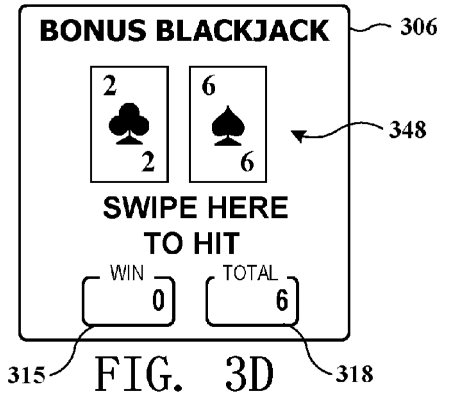
Figure 3E:
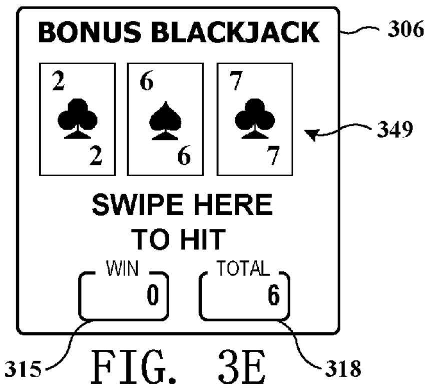
Figure 3F:
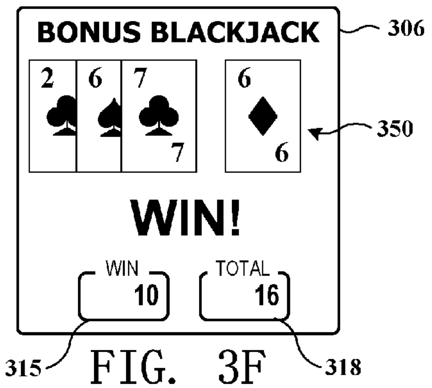

In FIG. 3D, the third round of the card game begins and the dealt cards 348 result in a total value of 8. As shown in FIG. 3E, a drawn card brings the total value of the cards 349 up to 15, which is still the below the minimum threshold for an award and progression to the next round. As shown in FIG. 3F, another drawn card brings the total value of the hand 350 up to 21, which is associated with an award of 10 credits and progression to a fourth round of the game.

Figure 3G:
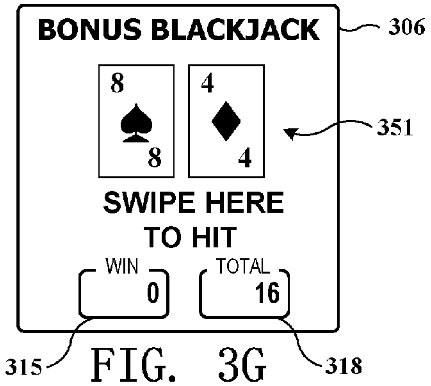
Figure 3H:
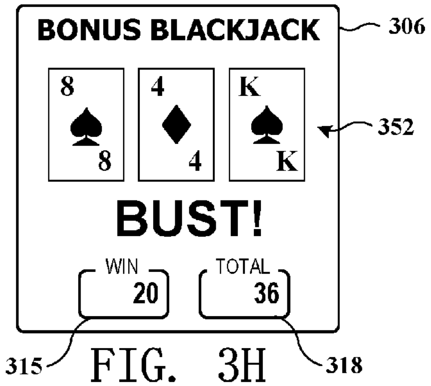

In FIG. 3G, the fourth round of the card game begins and the dealt cards 351 result in a total value of 12. Another card must be drawn to continue as discussed above. As shown in FIG. 3H, the drawn card pushes the total value of the hand 352 over 21 (to 22), which busts and ends the card game. As shown in the win meter 315 of FIG. 3H, a consolation award of 20 credits is provided, and a total game award of 36 is given to the player. In some embodiments, no consolation award is provided. In other embodiments, consolation awards are only provided for busting on the first hand or the first "n" number of hands. For example, a consolation award of 10 may be provided for busting on the first hand, 5 credits may be provided for busting on the second hand, and 2 credits may be provided for busting on the third hand, where no consolation award is provided for hands busting on the fourth or later rounds. In other embodiments, the amount of the consolation prize may be dependent on the type of "bust." For example busting with a total value of 22 may provide a different consolation award than busting with a total value of 23 or higher. These different values may or may not be shown to the player prior to having them draw or hit.

Figure 4:
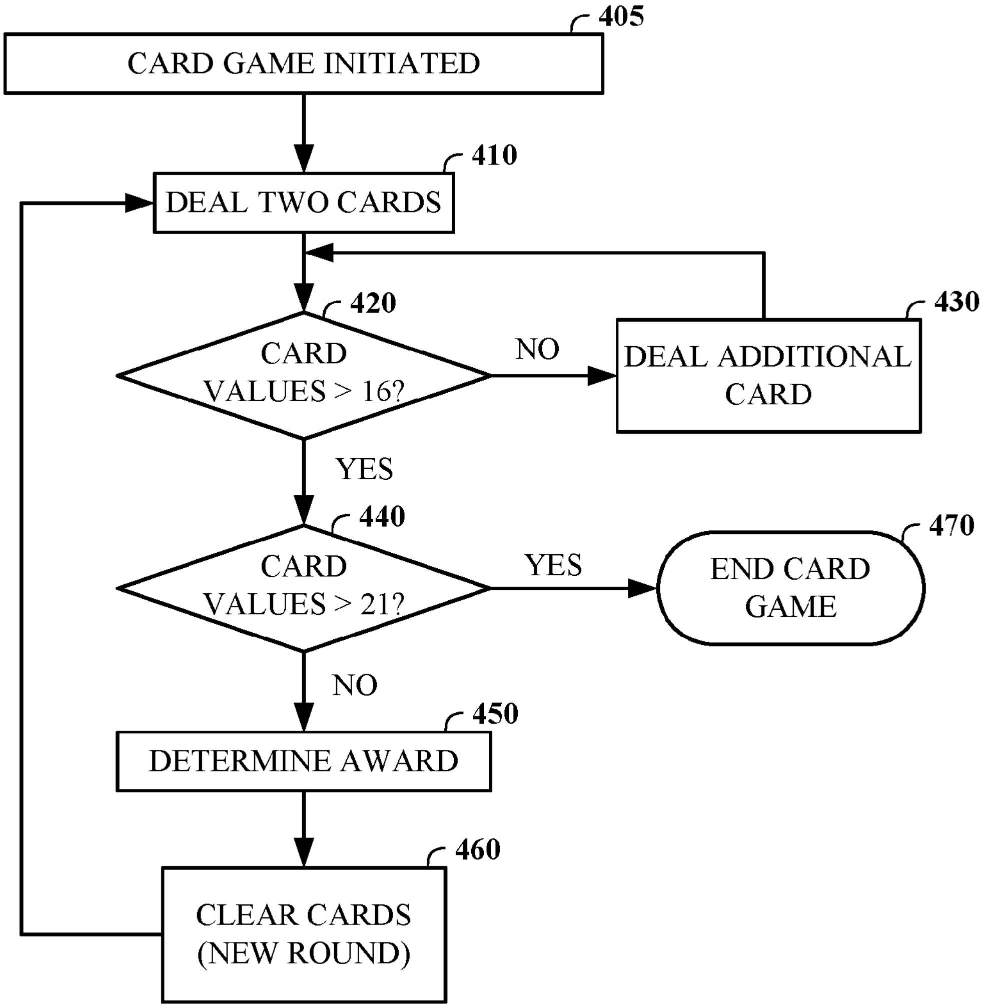
FIG. 4 is a flow diagram showing a method of playing a card game on a gaming device according to embodiments of the invention.

A flow diagram is shown in FIG. 4 that represents various embodiments including the embodiments discussed above. Although various processes are shown in a particular order in this flow diagram, the order of these processes can be changed in other embodiments without deviating from the scope or spirit of this concept. Hence, the order of the processes shown is for illustrative purposes only and is not meant to be restrictive. Additional game processes may also be included between various processes even though they are not shown in these flow diagrams for clarity purposes. Further each of the processes may be performed by components in a single game device, such as by a game processor, or may be performed in part or whole by a remote server or processor connected to the gaming device via a network. Each process may be encoded in instructions that are stored in a memory, a computer-readable medium, or another type of storage device. Note that this example method is just one embodiment of how a game operation can be implemented. As discussed and shown above (and below), many variations exist which may require additional, fewer, or different processes to complete.

Referring to FIG. 4, a card game is initiated in process 405 either by a triggering event (if the card game is a secondary or bonus game) or by a wager being placed (if the card game is a primary game). Two cards are dealt in process 410 and it is determined if the combined value of the cards is greater than 16 in process 420. If a value of 16 has not yet been exceeded, an additional card is dealt in process 430, and the hand value is analyzed again. When it is determined that the card values in the hand are above 16, process 440 determines if the total card value has "busted" above 21. If it has, the card game ends in process 470 where a consolation prize may be given in addition to any credits or prizes earned during the card game. If the total card value is above 16 but not above 21, process 450 determines an award or prize, followed by process 460, which clears the cards and initiates a new round. The operational flow then returns to process 410 for the next round where two new cards are dealt.

FIGS. 5A-5L show additional embodiments and variations on the card game. FIG. 5A illustrates a hand being dealt to a player. FIG. 5B shows that the dealt hand is a winning hand based on a paytable similar to that described above. FIG. 5C shows another dealt hand that does not reach a minimum card value threshold. FIG. 5D shows the hand in FIG. 5C after two more hits or draws. FIG. 5E shows an optional variation of a double down, where the "11" card value received can be played for double prizes. In a single card double down draw embodiment (shown in FIG. 5F), a player receives one additional draw card to make the minimum payment. As discussed above, the player may have to place a side wager for the double down option, or it may be available to the player at no additional cost. In an alternate embodiment (shown in FIG. 5G), a double down option may allow continued drawings or hits until an award is won, or the hand has busted (i.e., obtained a value greater than 21). FIG. 5H shows another optional variation of splitting dealt pairs of cards. FIG. 5I illustrates this split occurring and cards being drawn to each of the split hands. Again, an additional bet may be required to play the split, or it may not require an additional wager or risk. In FIG. 5J both split hands end up being winners, and it is shown that multiple hands may be dealt in the next round (shown in FIG. 5K). FIG. 5L illustrates an example paytable used with these embodiments.

Figure 6:
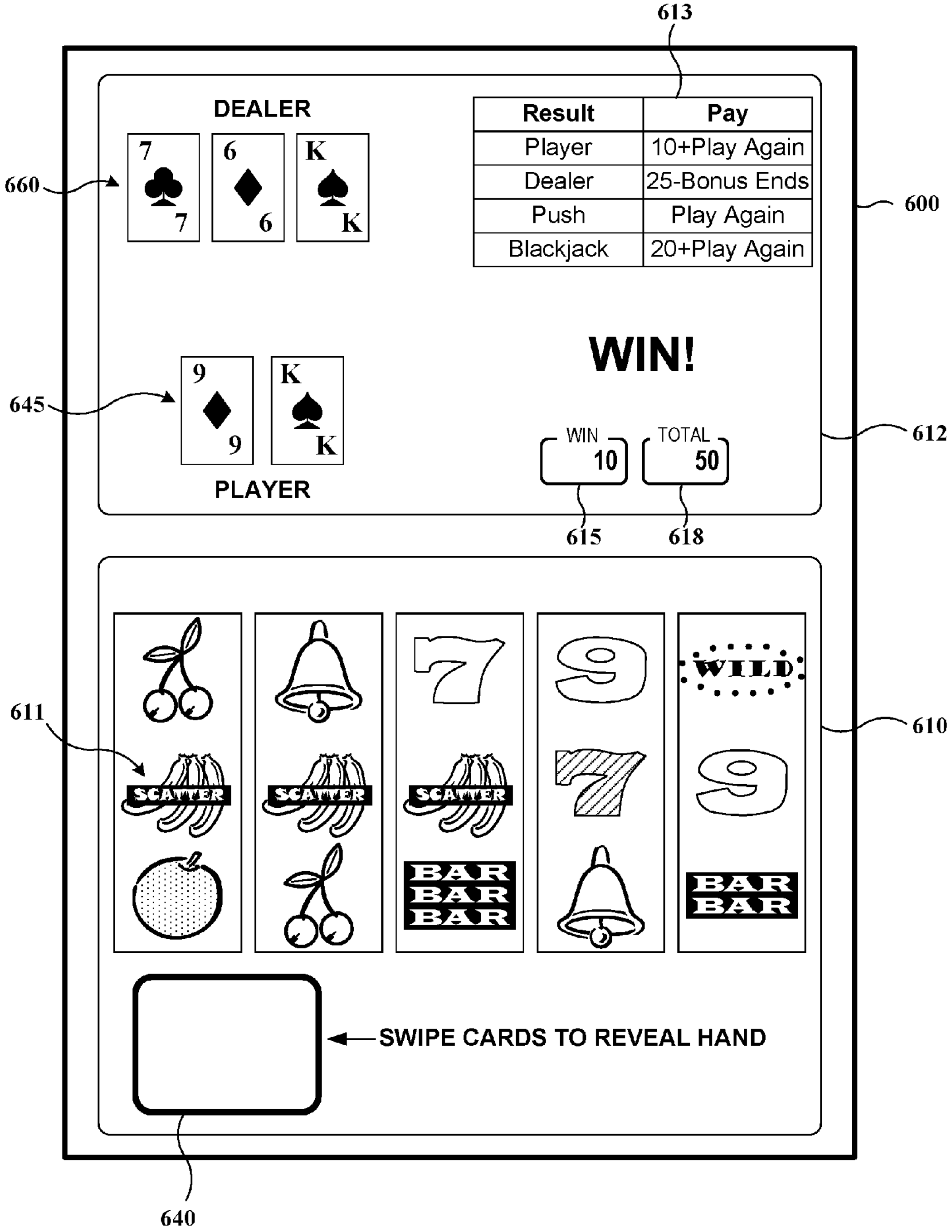
FIG. 6 is a diagram of a gaming display showing another secondary card game according to embodiments of the invention.

FIG. 6 illustrates another type of card game embodiment in a gaming device 600. In particular, the card game shown on the gaming device 600 in FIG. 6 has the player playing against a "dealer" or house hand instead of just a card value range. In other embodiments, a player may be playing against an actual dealer, or may be playing against one or more other players. In community embodiments, a player may be playing with other players against a dealer or computer.

Referring to FIG. 6, the gaming device 600 includes a primary game display 610 and a secondary game display 612 to implement a secondary card game according to embodiments of the invention. Here, a bonus triggering event is received in the base game (such as three scatter symbols 611 received on the first three/leftmost reels) shown on the primary game display 610. Cards 645 may have appeared face-down in the starting position 640 before being activated (by either swiping the cards on a touch screen covering the primary game display 610, or by pressing a button) and being shown face-up in the secondary game display 612, as shown. The secondary display may also include dealer cards 660, a win meter 615, a total award meter 618, and a result table 613.

As shown in FIG. 6, the player's cards 645 have a total card value of 19, while the dealer's cards 660 show that the dealer has busted (received more than a 21). In operation, the dealer's cards 660 may be both dealt face-down, may be dealt both face-up, or may be dealt with one up and one down. In any case, the player may have the option to either hit or stand (although the player cards may automatically be held when the player's cards total 21). Operation of how the "dealer" plays may be governed by any of the conventional blackjack rules known in the art. For example, the dealer may have to hit if their card values are 16 or less or if they have a soft 17 (an ace and 6). Various other side bets may be made along the lines of conventional blackjack, such as insurance, etc. as well as double downs, splits, and other features being available.

As shown in the result table 613, if the player wins by either having a higher card score than the dealer without going over 21, or by having the dealer bust (have more than 21), the player receives 10 credits and proceeds to a next round of the card game. If the dealer wins by having a higher card score than the player, or when the player busts, the card game ends and the player receives a consolation prize of 25 credits. If the player and dealer receive the same total value for their respective hands, no credits are awarded, and the game is either replayed in the current round, or moves to the next round of the card game. If the player receives a "blackjack" or 21 on the deal, the player receives 20 credits and proceeds to the next round.

Figure 7:
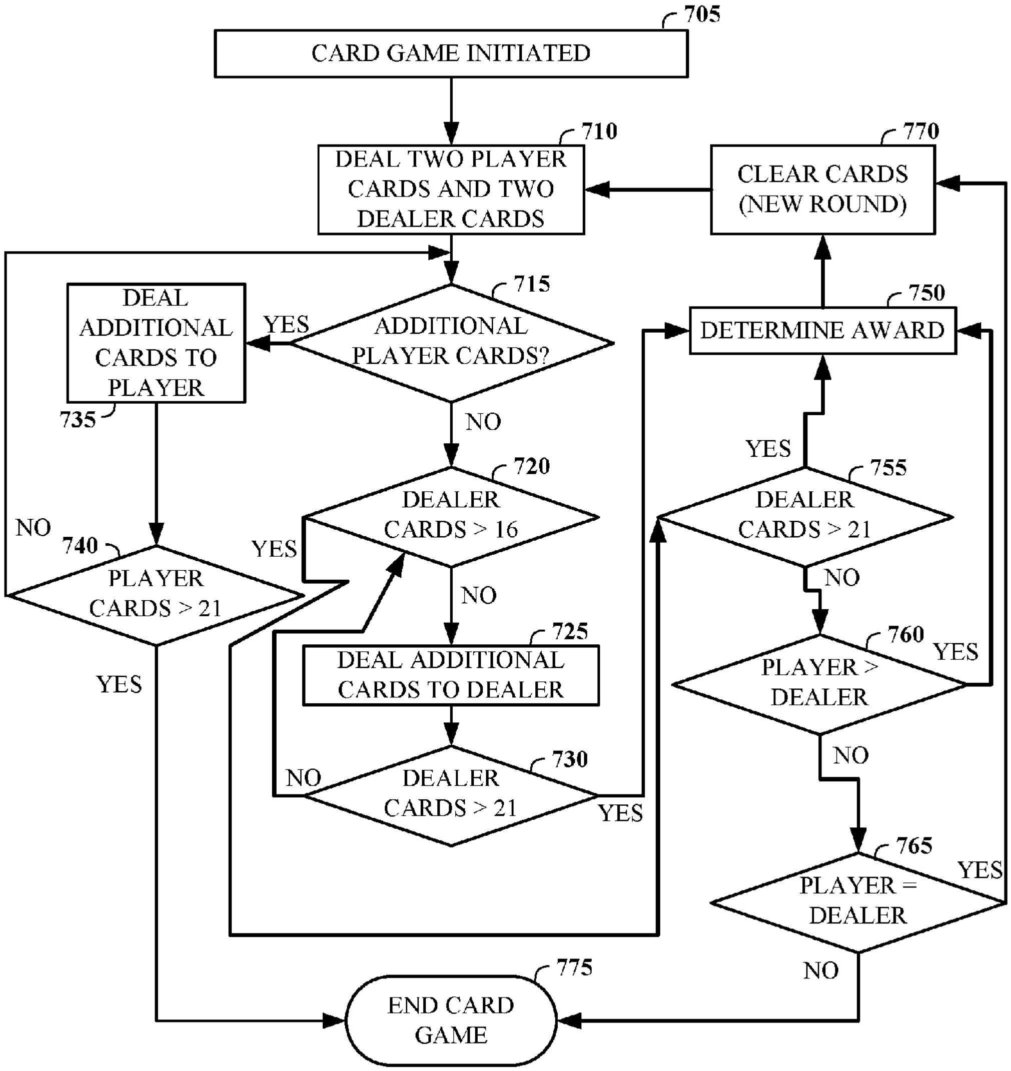
FIG. 7 is a flow diagram showing another method of playing a card game on a gaming device according to embodiments of the invention.

FIG. 7 is a flow diagram that illustrates some of these types of embodiments involving a dealer. A card game is initiated in process 705 and two cards are dealt to the player and the dealer in process 710. It is determined in process 715 if the player wants to hit or draw an additional card. If the player does, an additional card is dealt to the player in process 735. It is determined whether the additional card has busted the player's hand in process 740. If the player has busted, the game ends in process 775. If the player has not busted, the game then determines if the player requests any more additional cards by returning to process 715. Once the player is satisfied with his or her hand, the flow progresses to process 720 where it is determined if the dealer hand has a value greater than 16 (and not having a soft 17 in some embodiments). If the dealer hand does not meet a minimum requirement in process 720, an additional card is dealt to the dealer in process 725, and it is determined if the additional card has busted the dealer in process 730. If the dealer has busted, a player award is determined in process 750 and the cards are cleared for a new round in process 770. The operational flow then returns to process 710 where new cards are dealt for the new game round. If the dealer has not busted, the operational flow returns to process 720 to determine if the additional card has caused the dealer's hand to meet the minimum required value. When the dealer's hand has met the minimum required value, the operational flow progresses to process 755, where it is confirmed that the dealer has not busted (this process is useful when the dealer's initial hand meets the minimum required hand value). If the dealer has busted, awards are determined in process 750 and the operational flow starts a new game round as described above. If the dealer has not busted, it is determined in process 760 if the player has a higher valued hand than the dealer. If the player's hand has a higher value, the operational flow continues to process 750 again to determine an award and provide another game round. If the player's hand value is not larger than the dealer's hand value, it is determined in process 765 whether the hands are a push (i.e., the player's hand value is equal to the dealer's hand value). If the hands are a push, the operational flow may bypass giving the player any awards (or may progress to process 750 if awards are still paid for pushes) to process 770 where the cards are cleared and new game round is started. However, if the player's hand is not valued the same as the dealer's hand in process 765, the dealer's hand wins and the card game ends at process 775.

As discussed above, numerous variations exist. For example, in some embodiments a process may check to see if the dealer has a blackjack or 21 on the deal prior to allowing the player to draw additional cards, where the player will automatically lose if they do not also have a blackjack on the deal. In other examples, processes may check for conditions that allow for double downs, splits, etc.

FIGS. 8A-8L show additional embodiments and variations of the card game where a player is playing against an opponent, such as a computer dealer. FIG. 8A shows an embodiment where the player is playing against a dealer in a card game. In FIG. 8B, the player confirms they want to stand on the 20 they drew with their initial cards dealt in FIG. 8A. Since the total value of the dealer's cards do not meet a minimum threshold (e.g., 16), the dealer must hit as shown in FIGS. 8C and 8D. Since the dealer has met the threshold with the total card value of 17 in FIG. 8D, the dealer must stay with the 17. Thus, as shown in FIG. 8D, the player wins the first round of this example game. FIG. 8E shows an optional embodiment where a player may double down. FIG. 8F shows a double down embodiment where only one additional card is drawn on a double down. Here, the player does not automatically lose if they don't reach 17 (or another minimum threshold). Rather the dealer still has to beat them and not bust.

FIG. 8G shows an embodiment that employs special rules that may be implemented randomly or as a result of a predefined condition being met. In the example shown in FIG. 8G, the dealer is prevented from hitting or drawing additional cards for one game round. FIG. 8H shows another optional embodiment where a dealt pair of cards can be split. The player's split hands are then independently completed and compared against the dealer's hand as shown in FIG. 8I. As shown in FIGS. 8J and 8K, if both split hands win, the player may receive multiple dealt hands in the next game round. FIG. 8L shows an example paytable that may be used with these embodiments. Note that the player can still beat the dealer with less than a 17 (such as when the dealer busts) and progress to the next game round, but will not win bonus credits.

Figure 9G:
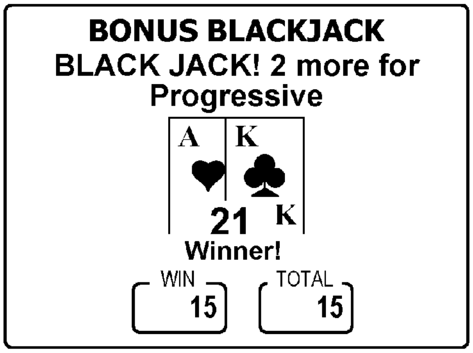

FIGS. 9A-9I show different variations that may be applied to various embodiments of the card game. In FIG. 9A, a player can select between multiple hands to play. As shown in FIG. 9B, the value of the non-selected hands (and/or the hands themselves) may be revealed to show what would have happened had they been selected. Another embodiment is shown in FIG. 9C where multiple of the available hands can/must be played. FIG. 9D illustrates an embodiment that includes a "frenzy" mode where various game rules may be changed to provide an increased (or decreased) chance of winning. Here, the minimum hand value for a winning hand has been lowered from 17 to 14. In FIG. 9E, an embodiment is shown where a random (or based on a met condition) multiplier is given for a current hand or next game round. FIG. 9F illustrates an embodiment that pays a bonus pay for reaching a certain number of cards in a player's hand. Here, for example, the player may be given a 10 credit bonus for getting 5 cards in their hand without busting.

Figure 9H:
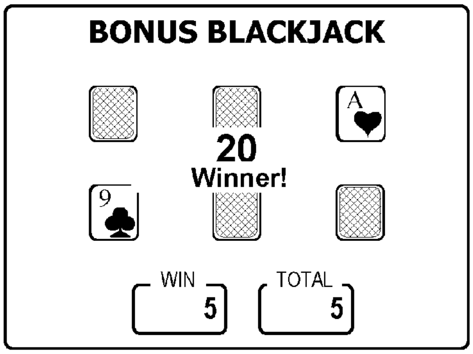
Figure 9I:
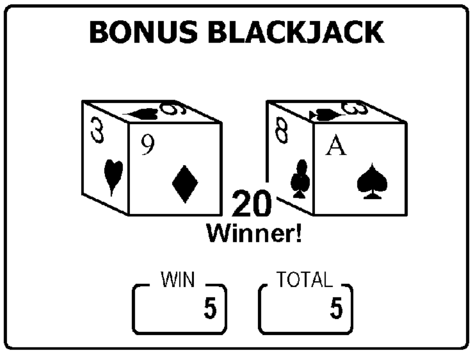

In FIG. 9G, an embodiment is shown where three consecutive blackjacks result in winning a progressive award. FIG. 9H illustrates an embodiment, where a player can pick the two cards to use as the two dealt cards. The remaining cards may be used for hit or draw cards, or another group of cards may be used for picking a hit or draw card. FIG. 9I illustrates an embodiment that uses dice or other shapes having card values on one or more of their faces to provide a dealt hand and/or draw cards.

Figure 10A:
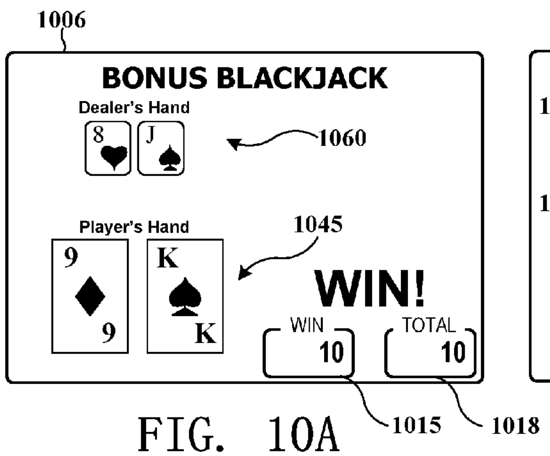
FIGS. 10A-10F are diagrams of a gaming display showing another progression of a card game according to embodiments of the invention.
Figure 10B:
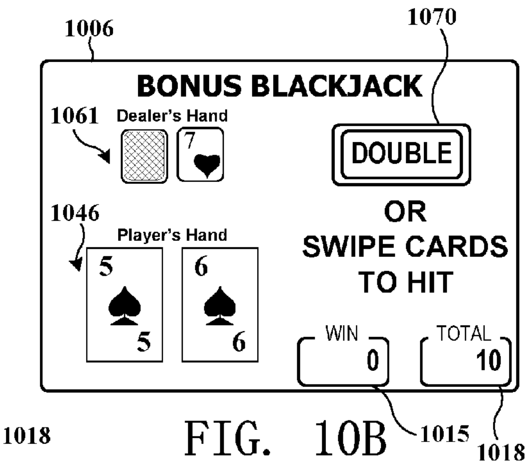
Figure 10C:
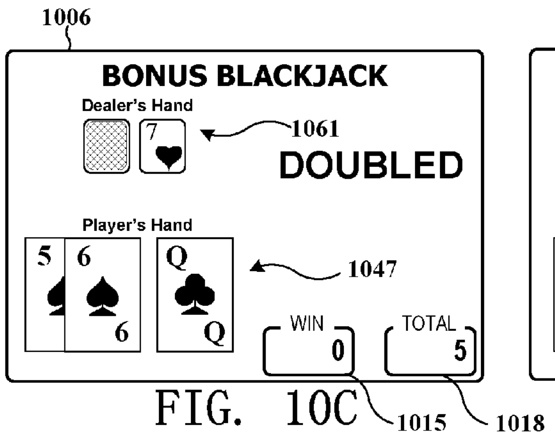
Figure 10D:
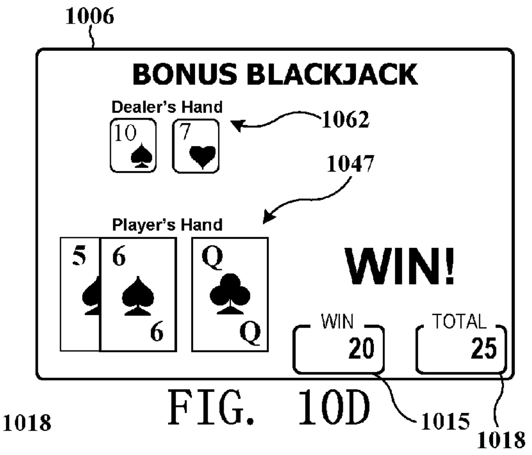
Figure 10E:
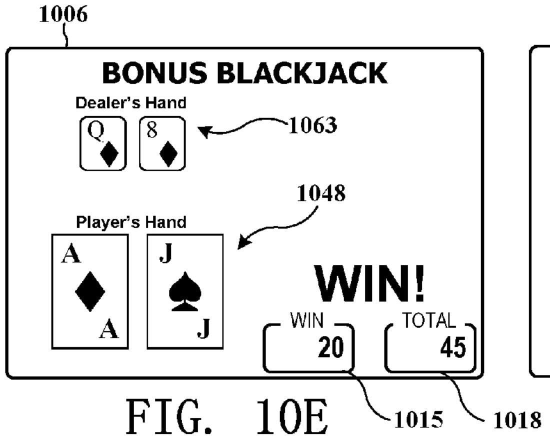
Figure 10F:
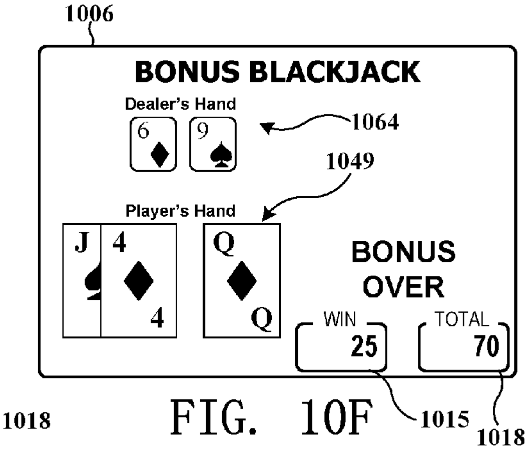

FIGS. 10A-10F illustrate an example game progression of a card game that is played against a dealer hand. Referring to FIGS. 10A-10F, a game display 1006 displays cards in a player's hand 1045, cards in a dealer's hand 1060, a win meter 1015, and a total award meter 1018. As shown in FIG. 10A, a player wins a first game round by drawing a hand 1045 with a value of 19, while the dealer's hand 1060 only received a value of 18. In FIG. 10B, the player has been dealt a hand 1046 with a value of 11 and is given the option of doubling down. Note that the dealer's hand 1061 has one card dealt face-down and one card dealt face-up, which may give the player some indication about what to do without showing exactly what total value the dealer has. The player is not required to double down in this embodiment. Rather, they have the option of hitting or drawing cards. In other embodiments, the player may also have the option of standing, although often times, doubling opportunities are only presented in situations where the player cannot bust (hence there is no incentive to stand). Doubling may require that the player forfeit part of their winnings or place an additional wager. As shown in FIG. 10C, the player has accepted the double down and a side wager for the double down of 5 credits is subtracted from the total winnings of the card game as shown on the total award meter 1018. The player draws one additional card in the double down, which in this example ends up being a face card with a value of 10; thereby bringing the total value of the player's hand 1047 up to 21. In FIG. 10D, the other card in the dealer's hand 1062 is revealed and it is determined if any more cards are drawn to the dealer's hand. Since the dealer's hand 1062 has a total value of 17, which meets the minimum threshold, the dealer must stand. Hence, the player's risk has paid off and they are rewarded with double the normal 10 credit pay (or 20 credits) for the win. In FIG. 10E, the player receives a blackjack in their dealt hand 1048 while the dealer's hand 1063 does not have a blackjack. Hence, the player is an automatic winner and receives 20 credits for the win. In FIG. 10F, the player's hand 1049 has busted. Thus, regardless of the card value in the dealer's hand 1064, the bonus is over. In this example, the player receives a 25 credit consolation prize bringing the overall bonus award to 70 credits.

Figure 11A:
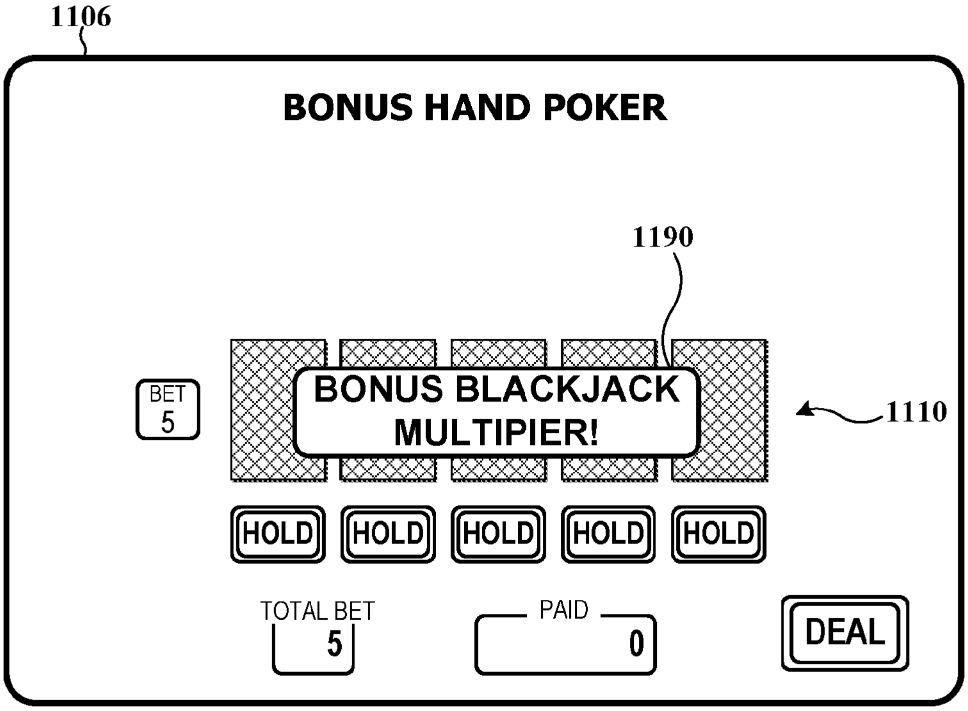
FIGS. 11A-11D are diagrams of a gaming display showing another progression of a card game according to embodiments of the invention.
Figure 11B:
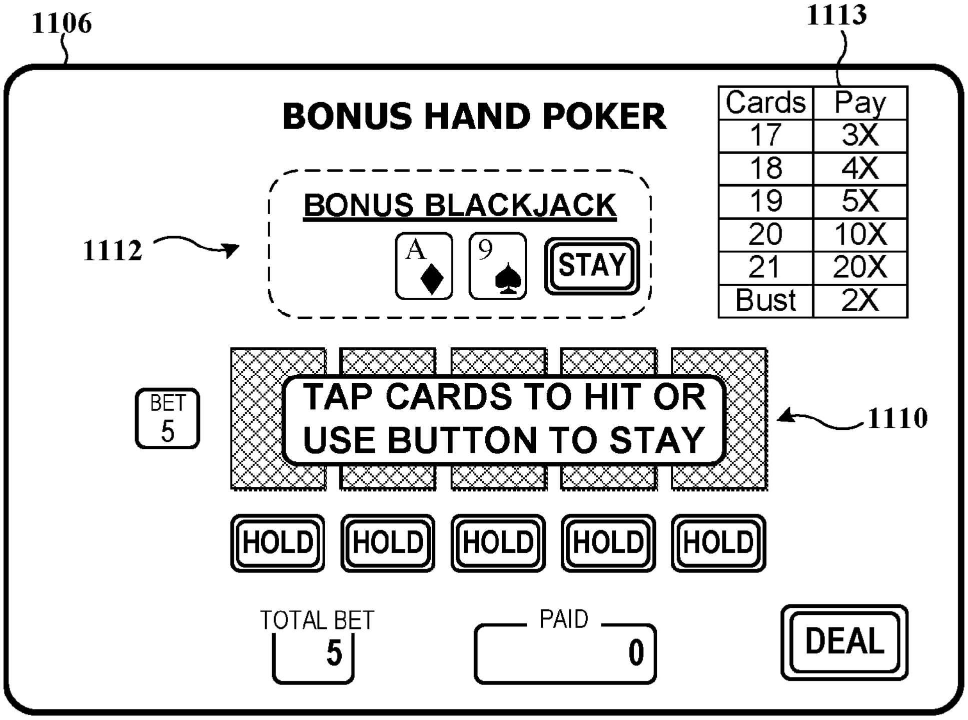
Figure 11C:
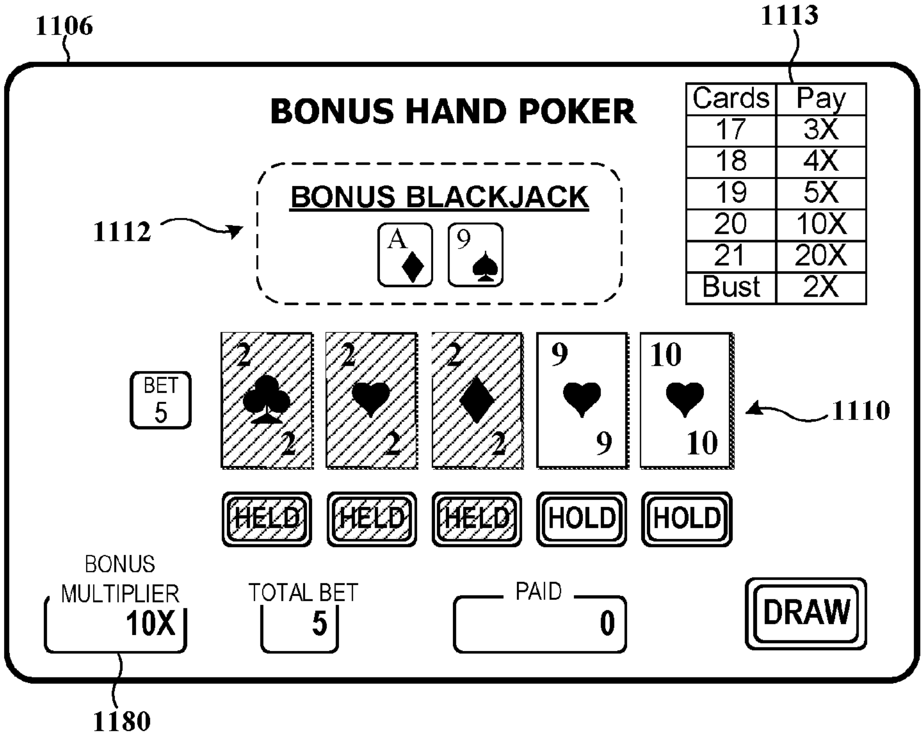
Figure 11D:
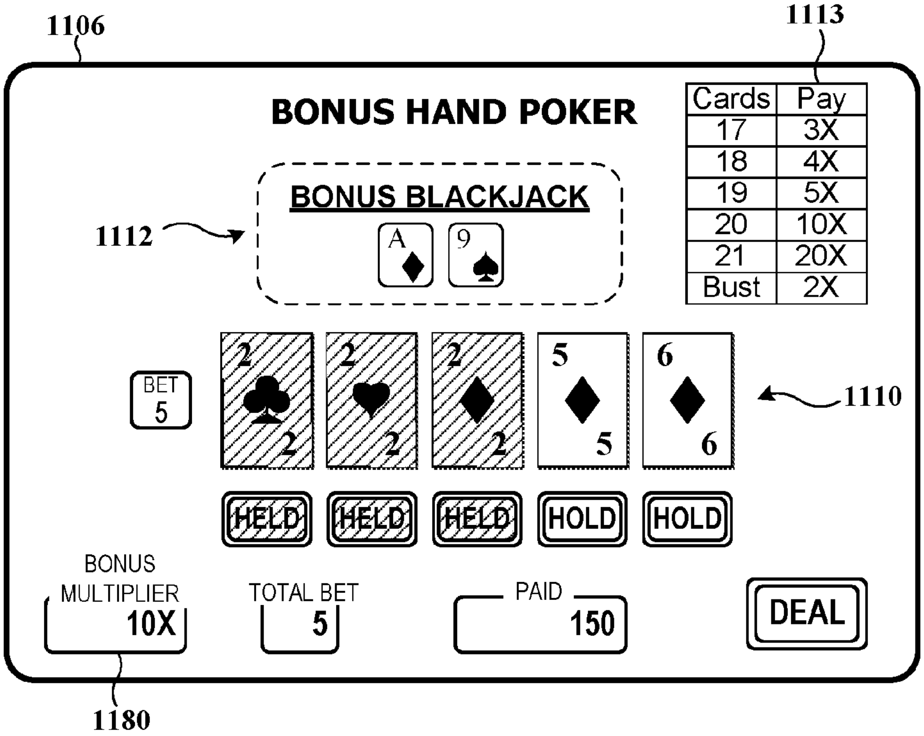

FIGS. 11A-11D illustrate another card game embodiment, where the card game outcome provides a modifier for awards in the underlying base game. Here, the base game is draw poker, and a blackjack mystery multiplier is randomly provided prior to the deal of the cards, and/or after the draw button has been activated, but before the draw cards are shown to multiply the any awards associated with the final poker hand. Referring to FIGS. 11A-11D, a game display 1106 includes a primary game portion 1110 including five card positions used in a draw poker game. As shown in FIG. 11A, a mystery blackjack multiplier game has been randomly activated, as communicated with the player notification window 1190, prior to the initial deal of the draw poker base game hand. FIG. 11B shows the bonus blackjack hand 1112 along with a paytable 1113 of possible multipliers. In this embodiment, the player does not automatically stay on any number except 21, as they are given the option to try for a higher multiplier even if they have already met a minimum win requirement. In the embodiment shown in FIG. 11B, the player chooses to stay on the dealt 20 for a "10×" multiplier. This multiplier is shown on a multiplier meter 1180, as shown in FIG. 11C, and the player can then play the primary poker game 1110 knowing that any award will be multiplied by the "10×" multiplier. Here, the player has been dealt three "2s," a "9H," and a "10H," and has held the three "2s" received on the deal. In FIG. 11D, the result of the draw is shown. Here, the draw did not improve the player's hand, but the three-of-a-kind has a pay of 3 times the 5 credit bet. This win of 15 is then multiplied by the "10×" multiplier for a total win of 150 credits. Although the underlying base game is shown to be a draw poker game, any type of base game may be used, such as a video slot game, a mechanical reel slot game, a keno game, a stud poker game, or any other type of known wagering game.

In other embodiments, a bonus card game may be played with each play of the base game, where the bonus card game may provide modifiers for any wins on the base game. For example, a two card bonus black jack hand may be dealt with each draw poker hand, where hand values of the bonus blackjack hand only provide multipliers when they are between 17 and 21 points. In another example, a bonus blackjack hand may be played with each base game, where the player (or device automatically) can hit or draw additional cards. In this example, a multiplier may only be given for hands that reach 20 or 21 points. Again, multiple possible variations exist in other embodiments.

Figure 12:
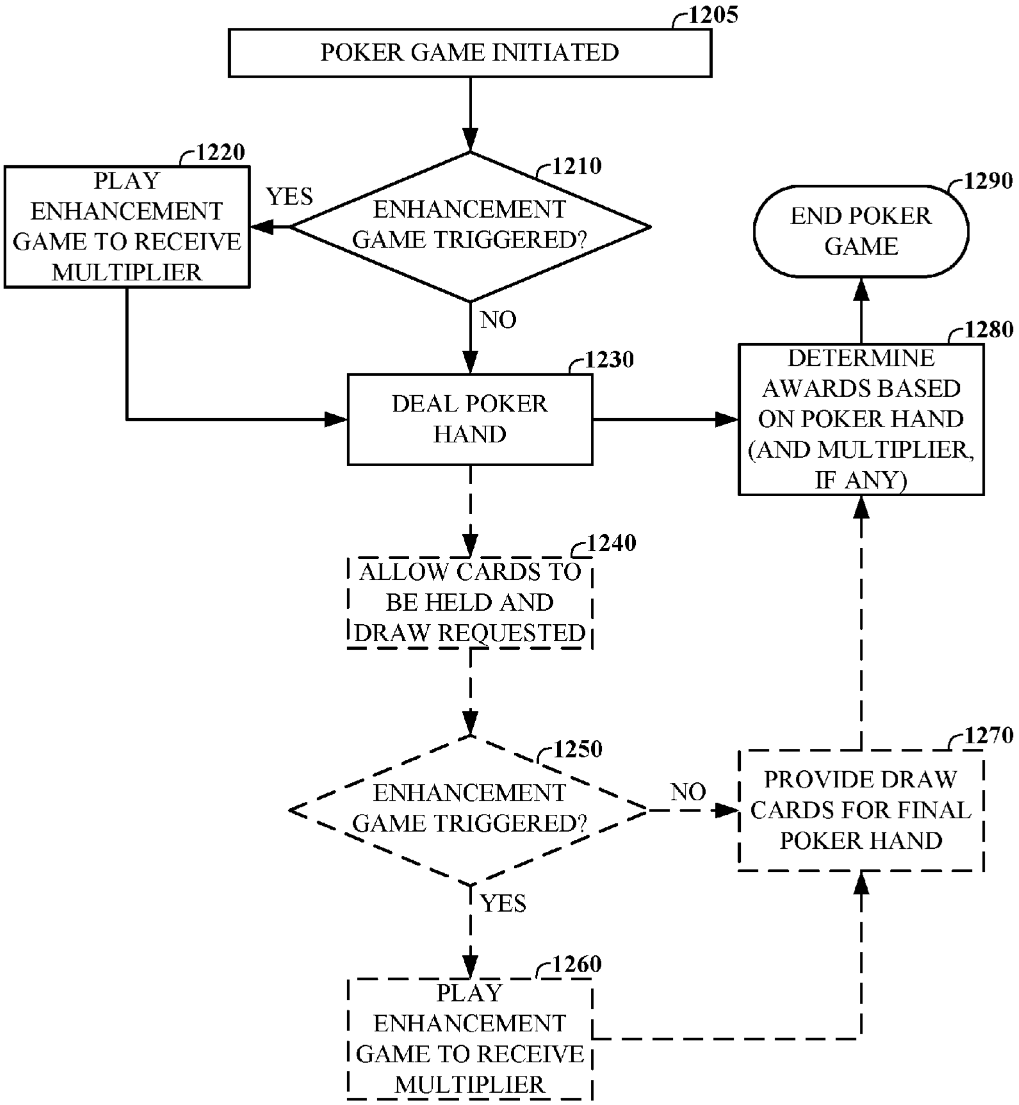
FIG. 12 is a flow diagram showing another method of playing a card game on a gaming device according to embodiments of the invention.

FIG. 12 shows a flow diagram of a card game embodiment used to modify a base game (a poker base game in this instance, but any base game type is possible). Note that the dashed processes are optional if the poker game is a draw poker game, whereas the solid boxed processes can be used for a draw poker base game or stud poker base game. In process 1205, a poker hand is dealt. It is determined in process 1210 if an enhancement card game is triggered, such as the bonus blackjack game to achieve a multiplier shown in FIGS. 11A-11D. If an enhancement game is triggered, the bonus enhancement game is played in process 1220 to receive a multiplier. Afterwards, or if the enhancement game was not triggered in process 1210, a poker hand is dealt in process 1230. If it is a stud poker game, the operational flow progresses to process 1280 where awards are determined based on the poker hand and any multipliers received in an enhancement game. The poker game then ends at 1290. If it is a draw poker game, the operational flow optionally progresses to process 1240 from process 1230 (after the initial poker hand is dealt) where cards in the dealt poker hand are allowed to be held, until a draw is requested. In process 1250, it is again determined whether an enhancement game is triggered. Although for draw poker games it is shown that an enhancement game can be triggered both before the initial deal and prior to draw cards being revealed, in some embodiments the enhancement game may be triggered only at one of these two events. Returning to process 1250, if the enhancement game is triggered, the enhancement game is played and a multiplier is received in process 1260. If the enhancement game was not triggered, the operational flow proceeds directly to process 1270 where the draw cards (if any) are revealed for the final poker hand. This final poker hand is again evaluated to determine awards in process 1280, and whether any multiplier has been received to modify awards associated with the final poker hand.

Figure 13:
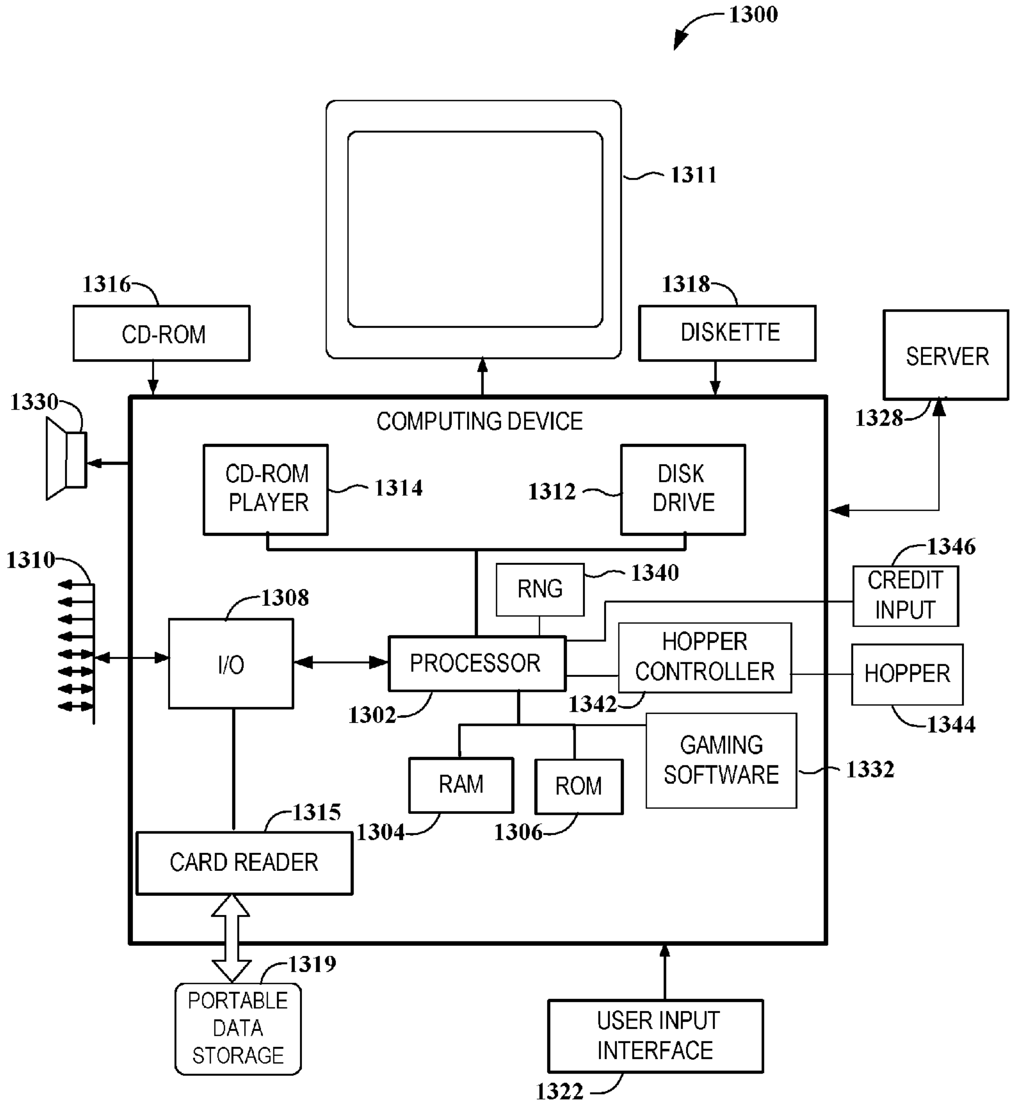
FIG. 13 is a block diagram illustrating a computing arrangement according to embodiments of the invention.

As may now be readily understood, one or more devices may be programmed to play various embodiments of the invention. The present invention may be implemented as a casino gaming machine or other special purpose gaming kiosk as described hereinabove, or may be implemented via computing systems operating under the direction of local gaming software, and/or remotely-provided software such as provided by an application service provider (ASP). The casino gaming machines utilize computing systems to control and manage the gaming activity. An example of a representative computing system capable of carrying out operations in accordance with the invention is illustrated in FIG. 13.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 1300 of FIG. 13 is an example computing structure that can be used in connection with such electronic gaming machines, computers, or other computer-implemented devices to carry out operations of the present invention.

The example computing arrangement 1300 suitable for performing the gaming functions in accordance with the present invention typically includes a central processor (CPU) 1302 coupled to random access memory (RAM) 1304 and some variation of read-only memory (ROM) 1306. The ROM 1306 may also represent other types of storage media to store programs, such as programmable ROM (PROM), erasable PROM (EPROM), etc. The processor 1302 may communicate with other internal and external components through input/output (I/O) circuitry 1308 and bussing 1310, to provide control signals, communication signals, and the like.

The computing arrangement 1300 may also include one or more data storage devices, including hard and floppy disk drives 1312, CD-ROM drives 1314, card reader 1315, and other hardware capable of reading and/or storing information such as DVD, etc. In one embodiment, software for carrying out the operations in accordance with the present invention may be stored and distributed on a CD-ROM 1316, diskette 1318, access card 1319, or other form of computer readable media capable of portably storing information. These storage media may be inserted into, and read by, devices such as the CD-ROM drive 1314, the disk drive 1312, card reader 1315, etc. The software may also be transmitted to the computing arrangement 1300 via data signals, such as being downloaded electronically via a network, such as the Internet. Further, as previously described, the software for carrying out the functions associated with the present invention may alternatively be stored in internal memory/storage of the computing device 1300, such as in the ROM 1306.

The computing arrangement 1300 is coupled to the display 1311, which represents a display on which the gaming activities in accordance with the invention are presented. The display 1311 represents the "presentation" of the video information in accordance with the invention, and may be any type of known display or presentation screen, such as liquid crystal displays, plasma displays, cathode ray tubes (CRT), digital light processing (DLP) displays, liquid crystal on silicon (LCOS) displays, etc.

Where the computing device 1300 represents a stand-alone or networked computer, the display 1311 may represent a standard computer terminal or display capable of displaying multiple windows, frames, etc. Where the computing device is embedded within an electronic gaming machine, the display 1311 corresponds to the display screen of the gaming machine/kiosk. A user input interface 1322 such as a mouse, keyboard/keypad, microphone, touch pad, trackball, joystick, touch screen, voice-recognition system, etc. may be provided. The display 1311 may also act as a user input device, e.g., where the display 1311 is a touch-screen device.

Chance-based gaming systems such as slot machines, in which the present invention is applicable, are governed by random numbers and processors, as facilitated by a random number generator (RNG). The fixed and dynamic symbols generated as part of a gaming activity may be produced using one or more RNGs. RNGs as known in the art may be implemented using hardware, software operable in connection with the processor 1302, or some combination of hardware and software. The present invention is operable using any known RNG, and may be integrally programmed as part of the processor 1302 operation, or alternatively may be a separate RNG controller 1340.

The computing arrangement 1300 may be connected to other computing devices or gaming machines, such as via a network. The computing arrangement 1300 may be connected to a network server 1328 in an intranet or local network configuration. The computer may further be part of a larger network configuration as in a global area network (GAN) such as the Internet. In such a case, the computer may have access to one or more web servers via the Internet. In other arrangements, the computing arrangement 1300 may be configured as an Internet server and software for carrying out the operations in accordance with the present invention may interact with the player via one or more networks.

Other components directed to gaming machine implementations include manners of gaming participant payment, and gaming machine payout. For example, a gaming machine including the computing arrangement 1300 may also include a hopper controller 1342 to determine the amount of payout to be provided to the participant. The hopper controller may be integrally implemented with the processor 1302, or alternatively as a separate hopper controller 1342. A hopper 1344 may also be provided in gaming machine embodiments, where the hopper serves as the mechanism holding the coins/tokens of the machine. The wager input module 1346 represents any mechanism for accepting coins, tokens, coupons, bills, electronic fund transfer (EFT), tickets, credit cards, smart cards, membership cards, etc., for which a participant inputs a wager amount. It will be appreciated that the primary gaming software 1332 may be able to control payouts via the hopper 1344 and controller 1342 for independently determined payout events.

Among other functions, the computing arrangement 1300 provides an interactive experience to players via input interface 1322 and output devices, such as the display 1311, speaker 1330, etc. These experiences are generally controlled by gaming software 1332 that controls a primary gaming activity of the computing arrangement 1300. The gaming software 1332 may be temporarily loaded into RAM 1304, and may be stored locally using any combination of ROM 1306, drives 1312, media player 1314, or other computer-readable storage media known in the art. The primary gaming software 1332 may also be accessed remotely, such as via the server 1328 or the Internet. The primary gaming software 1332 in the computing arrangement 1300 is shown here as an application software module. According to embodiments of the present invention, this software 1332 provides a slot game or similar game of chance as described hereinabove. For example, the software 1332 may present, by way of the display 1311, representations of symbols to map or otherwise display as part of a slot based game having reels. However, in other embodiments, the principles of this concept may be applied to poker games or other types of games of chance. One or more aligned positions of these game elements may be evaluated to determine awards based on a paytable. The software 1332 may include instructions to provide other functionality as known in the art and described herein, such as shown and described above regarding FIGS. 1-12.

The foregoing description of the exemplary embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A method of operating a gaming device having a player input device, a game display, a memory configured to store a credit amount and store a table identifying a predefined minimum threshold and a predefined maximum threshold, a wager input device structured to accept physical items associated with a currency amount, and a processor, the method comprising:

receiving a signal from the wager input device indicating receipt of a physical item associated with a currency amount;

increasing the credit amount in memory based upon the received signal from the wager input device;

receiving a signal initiating a primary game event on the game display, the signal indicating a wager amount, where the credit amount is reduced by the wager amount;

determining an outcome for the primary game event;

initiating a secondary bonus event when a triggering condition is satisfied, the secondary bonus event comprising the steps of:

(a) dealing two playing cards representing a player's hand, (b) determining a value of the player's hand, (c) providing a secondary award when the determined value of the player's dealt hand exceeds the predefined minimum threshold, (d) drawing an additional card for the player's hand to form a modified player's hand when the determined value of the player's hand does not meet the predefined minimum threshold, (e) determining if the value of the modified player's hand exceeds the predefined maximum threshold, (f) ending the secondary bonus event when the determined value of the modified player's hand exceeds the predefined maximum threshold, (g) providing a secondary award when the value of the modified player's hand exceeds the predefined minimum threshold while remaining less than or equal to the predefined maximum threshold, and (h) repeating steps (d)-(g) when modified player's hand does not meet the predefined minimum threshold; and providing any awards associated with the primary gaming event and the secondary bonus event, where the provided awards increase the credit amount stored in memory.

2. The method of claim 1, wherein the steps of providing a secondary award include:

determining a secondary award from a table of values associated with possible player hand values based on the determined value of the player's hand; and providing the determined secondary award.

3. The method of claim 1, wherein the steps of providing a secondary award include:

determining a modifier from a table of modifiers associated with possible player hand values based on the determined value of the player's hand; and modifying any award determined for the primary game with the determined modifier.

4. The method of claim 3, wherein the table of modifiers includes a table of multipliers.

5. The method of claim 1, wherein the secondary bonus event is a multiple round event, and wherein a next round of the bonus event is presented when a secondary award is presented for a current round of the bonus event, the next round of the bonus event repeating steps (a)-(h) until the secondary bonus event is ended when the determined value of the modified player's hand exceeds the predefined maximum threshold.

6. The method of claim 1, wherein determining a value of the player's hand includes assigning a value of card equal to a rank of the card for each card associated with a numerical rank, assigning a value of 10 for each face card, and assigning a better value of either 1 or 11 for each Ace.

7. The method of claim 1, wherein providing the secondary bonus event further comprises providing an option to double all possible secondary bonus awards in exchange for a side bet when the determined value of the player's dealt hand in step (b) is a 9, 10, or 11.

8. The method of claim 7, where only a single additional card may be drawn after an option to double all possible secondary bonus awards is accepted.

9. The method of claim 1, wherein providing the secondary bonus event further comprises:

providing an option to split dealt cards in step (a) that have an identical rank; and forming two hands from the split cards, wherein steps (b)-(h) are completed for each split hand.

10. A method of operating a gaming device to play a multiple round card game, the gaming device a player input device, a game display, a memory configured to store a credit amount and store a table identifying a predefined minimum threshold and a predefined maximum threshold, a wager input device structured to accept physical items associated with a currency amount, and a processor, the method comprising:

receiving a signal from the wager input device indicating receipt of a physical item associated with a currency amount;

increasing the credit amount in memory based upon the received signal from the wager input device;

receiving a signal initiating a multiple round card game on the game display, the signal indicating a wager amount, where the credit amount is reduced by the wager amount;

initiating a first round of the card game by dealing two cards to a player's hand and two cards to a dealer's hand;

providing options of standing with a current player's hand or adding additional cards to the player's hand;

adding an additional card to the player's hand when a signal is received indicating an option choice to add a card;

ending the multiple round card game when the addition of the additional card to the player's hand causes the player's hand to exceed a predefined maximum threshold;

revealing a dealer's hand when a signal is received indicating an option choice to stand;

adding cards to the dealer's hand when a value of the dealer's hand does not meet a predefined minimum threshold;

determining a winner between the player's hand and the dealer's hand, where the higher valued hand is the winning hand unless the value of the dealer's hand exceeds the predefined maximum threshold, in which case the player's hand is the winning hand;

automatically proceeding to a second round of the card game when the player is determined to be the winner;

repeating the steps for the first round of the card game in the second round of the card game; and awarding a collective award from all played rounds of the multiple round card game.

11. The method of claim 10, wherein receiving a signal to initiate the multiple round card game includes receiving a bonus triggering signal during play of a primary base game, where the multiple round card game is a secondary bonus game.

12. The method of claim 10, wherein the dealer's cards are dealt with one card face-up and one card face-down.

13. The method of claim 10, further comprising awarding a special prize when the player hand wins and the player's hand meets a predefined condition.

14. The method of claim 13, wherein the special prize is a multiplier that is activated for the second round.

15. The method of claim 13, wherein the special prize is a change to the predefined minimum threshold that determines if the dealer gets additional cards for the second round.

16. The method of claim 13, wherein the special prize is preventing the dealer from drawing any additional cards for the second round.

17. A gaming device comprising:

a player input device;

a game display;

a memory configured to store a credit amount, and to store a table identifying a predefined minimum threshold and a predefined maximum threshold;

a wager input device structured to accept physical items associated with a currency amount; and a processor configured to:

receive a signal from the wager input device indicating receipt of a physical item associated with a currency amount;

increase the credit amount in memory based upon the received signal from the wager input device;

receive a signal initiating a primary game event on the game display, the signal indicating a wager amount, where the credit amount is reduced by the wager amount;

receive a signal that the secondary bonus card game has been triggered during play of a primary base game;

present a plurality of cards face-down;

receive a selection signal indicating a selection of two of the plurality of cards;

display the two indicated cards face-up as a player's hand;

determine a value of the player's hand;

provide a secondary award when the determined value of the player's dealt hand exceeds a predefined minimum threshold;

draw an additional card for the player's hand to form a modified player's hand when the determined value of the player's hand does not meet the predefined minimum threshold;

determine if the value of the modified player's hand exceeds a predefined maximum threshold;

end the secondary bonus event when the determined value of the modified player's hand exceeds the predefined maximum threshold; and provide a secondary award when the value of the modified player's hand exceeds the predefined minimum threshold while remaining less than or equal to the predefined maximum threshold.

18. The gaming device of claim 17, wherein the plurality of face-down cards are presented in pairs, and wherein the selection signal indicates a selection of one of the pairs of cards.

19. The gaming device of claim 17, wherein the plurality of face-down cards are presented individually, and wherein the selection signal indicates individual selections of two of the plurality of cards.

20. The gaming device of claim 17, wherein the steps of drawing an additional card, determining if the value of the modified player's hand exceeds a predefined maximum threshold, ending the secondary bonus event when the determined value of the modified player's hand exceeds the predefined maximum threshold, and providing a secondary award when the value of the modified player's hand exceeds the predefined minimum threshold while remaining less than or equal to the predefined maximum threshold are repeated when modified player's hand does not meet the predefined minimum threshold.

* * * * *